US012433182B2

(12) United States Patent
Sasamoto et al.

(10) Patent No.: US 12,433,182 B2
(45) Date of Patent: Oct. 7, 2025

(54) FARMING SUPPORT SYSTEM, POSITION INFORMATION GENERATION METHOD, COMPUTER PROGRAM, AND PROCESSING DEVICE

(71) Applicant: KUBOTA CORPORATION, Osaka (JP)

(72) Inventors: Hirokazu Sasamoto, Sakai (JP); Yasuhiro Nishida, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 319 days.

(21) Appl. No.: 17/559,634

(22) Filed: Dec. 22, 2021

(65) Prior Publication Data

US 2022/0201921 A1    Jun. 30, 2022

(30) Foreign Application Priority Data

Dec. 24, 2020  (JP) .................................. 2020-215365

(51) Int. Cl.
*A01B 69/00* (2006.01)
*A01D 34/00* (2006.01)
*A01D 89/00* (2006.01)
*G05D 1/00* (2024.01)

(52) U.S. Cl.
CPC .......... *A01B 69/004* (2013.01); *A01D 34/008* (2013.01); *A01D 89/001* (2013.01); *G05D 1/0219* (2013.01); *G05D 1/0274* (2013.01); *G05D 1/0278* (2013.01)

(58) Field of Classification Search
CPC .. A01B 69/004; A01D 34/008; G05D 1/0219; G05D 1/0274; G05D 1/0278; G05D 2201/0201
See application file for complete search history.

(56) References Cited

U.S. PATENT DOCUMENTS

| | | | |
|---|---|---|---|
| 8,234,033 | B2 | 7/2012 | Brubaker et al. |
| 9,930,834 | B2 | 4/2018 | Chaney et al. |
| 2006/0251068 | A1 | 11/2006 | Judge et al. |

(Continued)

FOREIGN PATENT DOCUMENTS

| | | | |
|---|---|---|---|
| EP | 3 162 189 A2 | 5/2017 | |
| EP | 2 036 246 B1 | 12/2018 | |

(Continued)

*Primary Examiner* — Anne Marie Antonucci
*Assistant Examiner* — Patrick M Brady
(74) *Attorney, Agent, or Firm* — Keating & Bennett, LLP

(57) ABSTRACT

A farming support system includes a position detector provided in one of a work vehicle and a rake implement attachable to the work vehicle, and a processor configured or programmed to obtain, based on information about the rake implement, a positional relationship between a reference point to be positioned by the position detector and a swath to be formed by the rake implement, in a local coordinate system that is defined for the work vehicle and the rake implement attached thereto. The processor is configured or programmed to generate swath position information indicating a position of the swath in a geographic coordinate system, based on information indicating a position of the reference point in the geographic coordinate system detected by the position detector during forming of the swath, and the positional relationship.

19 Claims, 34 Drawing Sheets

(56) References Cited

U.S. PATENT DOCUMENTS

| | | | |
|---|---|---|---|
| 2006/0282205 A1* | 12/2006 | Lange | G01C 21/20 |
| | | | 701/50 |
| 2007/0005208 A1 | 1/2007 | Han et al. | |
| 2015/0134175 A1* | 5/2015 | Derscheid | G05D 1/0278 |
| | | | 701/23 |
| 2017/0027101 A1* | 2/2017 | Wilkening | A01F 15/00 |
| 2017/0057680 A1* | 3/2017 | Schlichting | G06K 7/10425 |
| 2017/0118918 A1 | 5/2017 | Chaney et al. | |
| 2018/0202804 A1* | 7/2018 | Dumble | G01B 21/16 |
| 2018/0368331 A1 | 12/2018 | Kurata et al. | |
| 2020/0375095 A1* | 12/2020 | Koto | A01D 34/125 |
| 2021/0144902 A1* | 5/2021 | Allgaier | A01B 69/003 |
| 2021/0191408 A1* | 6/2021 | Hayashida | G05D 1/0061 |
| 2022/0164941 A1* | 5/2022 | Frei | G06F 18/211 |

FOREIGN PATENT DOCUMENTS

| | | |
|---|---|---|
| JP | 2018-183072 A | 11/2018 |
| JP | 2018-185593 A | 11/2018 |
| JP | 2019-004729 A | 1/2019 |
| JP | 2019-118273 A | 7/2019 |
| WO | 2010/003421 A1 | 1/2010 |

* cited by examiner

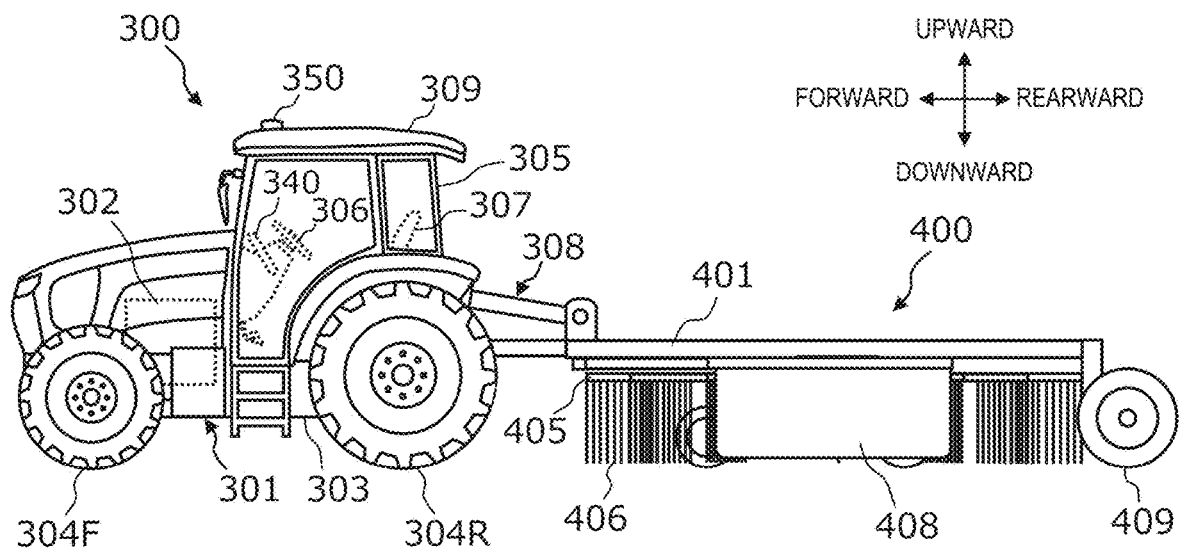
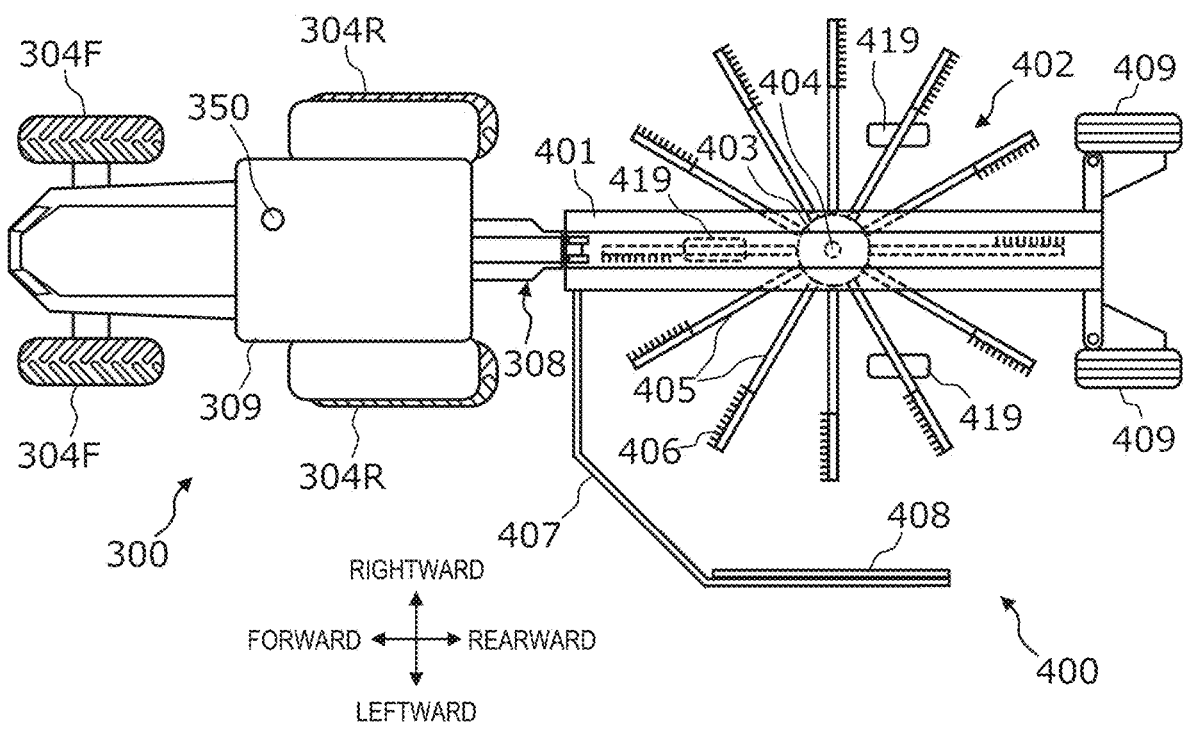

FIG.10

| MODEL NO. OF TRACTOR | MODEL NO. OF IMPLEMENT | FIRST POSITIONAL RELATIONSHIP INFORMATION (L1X, L1Y) |
|---|---|---|
| M12312G | R13513A | (-4560, -2850) |
| M12312G | R13515A | (-4770, -3060) |
| ⋮ | ⋮ | ⋮ |
| M34534W | R13513A | (-4780, -3260) |
| M34534W | R13515A | (-4990, -3470) |
| ⋮ | ⋮ | ⋮ |

FIG.11

| TIME | AZIMUTH INFORMATION | REFERENCE POINT POSITION INFORMATION | SWATH POSITION INFORMATION |
|---|---|---|---|
| 14:05:20.00 | 17.8 | 42.818501, 141.728265 | 42.818462, 141.728229 |
| 14:05:21.00 | 18.5 | 42.818510, 141.728268 | 42.818471, 141.728232 |
| 14:05:22.00 | 18.1 | 42.818519, 141.728271 | 42.818480, 141.728235 |
| 14:05:23.00 | 18.8 | 42.818528, 141.728274 | 42.818489, 141.728238 |
| 14:05:24.00 | 18.2 | 42.818537, 141.728277 | 42.818498, 141.728241 |
| 14:05:25.00 | 18.0 | 42.818546, 141.728280 | 42.818507, 141.728244 |
| 14:05:26.00 | 17.9 | 42.818555, 141.728283 | 42.818516, 141.728247 |
| 14:05:27.00 | 17.7 | 42.818564, 141.728286 | 42.818525, 141.728250 |
| 14:05:28.00 | 18.3 | 42.818573, 141.728289 | 42.818534, 141.728253 |
| 14:05:29.00 | 18.8 | 42.818582, 141.728292 | 42.818543, 141.728256 |
| ⋮ | ⋮ | ⋮ | ⋮ |

*FIG.15*

| WORK VEHICLE INFORMATION | |
|---|---|
| MODEL NO. OF TRACTOR | TRACTOR CORRECTION VALUE (L2X, L2Y) |
| M12312G | (-2370, -300) |

| RAKE IMPLEMENT INFORMATION | |
|---|---|
| MODEL NO. OF IMPLEMENT | IMPLEMENT CORRECTION VALUE (L3X, L3Y) |
| R13513A | (-2190, -2550) |

FIG.17

| MODEL NO. OF TRACTOR | MODEL NO. OF IMPLEMENT | INTER-REFERENCE POSITION CORRECTION VALUE (L4X, L4Y) |
|---|---|---|
| M12312G | R13513A | (-4170, 0) |
| M12312G | R13515A | (-4380, 0) |
| ⋮ | ⋮ | ⋮ |
| M34534W | R13513A | (-4390, -110) |
| M34534W | R13515A | (-4500, -110) |
| ⋮ | ⋮ | ⋮ |

FIG.19

| MODEL NO. OF TRACTOR | MODEL NO. OF IMPLEMENT | REFERENCE POSITION CORRECTION VALUE (L5X, L5Y) |
|---|---|---|
| M12312G | R13513A | (-3750, 0) |
| M12312G | R13515A | (-3960, 0) |
| ⋮ | ⋮ | ⋮ |
| M34534W | R13513A | (-3970, -110) |
| M34534W | R13515A | (-4080, -110) |
| ⋮ | ⋮ | ⋮ |

*FIG.20*

| TIME | FIRST END OF SWATH | CENTER OF SWATH | SECOND END OF SWATH |
|---|---|---|---|
| 14:05:20.00 | 42.818462, 141.728229 | 42.818461, 141.728235 | 42.818460, 141.728241 |
| 14:05:21.00 | 42.818471, 141.728232 | 42.818470, 141.728238 | 42.818469, 141.728244 |
| 14:05:22.00 | 42.818480, 141.728235 | 42.818479, 141.728241 | 42.818478, 141.728247 |
| 14:05:23.00 | 42.818489, 141.728238 | 42.818488, 141.728244 | 42.818487, 141.728250 |
| 14:05:24.00 | 42.818498, 141.728241 | 42.818497, 141.728247 | 42.818496, 141.728253 |
| 14:05:25.00 | 42.818507, 141.728244 | 42.818506, 141.728250 | 42.818505, 141.728256 |
| 14:05:26.00 | 42.818516, 141.728247 | 42.818515, 141.728253 | 42.818514, 141.728259 |
| 14:05:27.00 | 42.818525, 141.728250 | 42.818524, 141.728256 | 42.818523, 141.728262 |
| 14:05:28.00 | 42.818534, 141.728253 | 42.818533, 141.728259 | 42.818532, 141.728265 |
| 14:05:29.00 | 42.818543, 141.728256 | 42.818542, 141.728262 | 42.818541, 141.728268 |
| ⋮ | ⋮ | ⋮ | ⋮ |

FIG.22

| RAKE IMPLEMENT INFORMATION ||
|---|---|
| MODEL NO. OF IMPLEMENT | GRASS RANGE INFORMATION L6Y |
| R13513A | 4120 |

FIG.23

| FIRST SWATH INFORMATION ||||
|---|---|---|---|
| TIME | POSITION OF SWATH S1 | POSITION OF GRASS P1 | POSITION OF GRASS P2 |
| 14:05:20.00 | 42.818462, 141.728229 | 42.818462, 141.728229 | 42.818452, 141.728279 |
| 14:05:21.00 | 42.818471, 141.728232 | 42.818471, 141.728232 | 42.818461, 141.728282 |
| 14:05:22.00 | 42.818480, 141.728235 | 42.818480, 141.728235 | 42.818470, 141.728285 |
| 14:05:23.00 | 42.818489, 141.728238 | 42.818489, 141.728238 | 42.818479, 141.728288 |
| 14:05:24.00 | 42.818498, 141.728241 | 42.818498, 141.728241 | 42.818488, 141.728291 |
| 14:05:25.00 | 42.818507, 141.728244 | 42.818507, 141.728244 | 42.818497, 141.728294 |
| 14:05:26.00 | 42.818516, 141.728247 | 42.818516, 141.728247 | 42.818506, 141.728297 |
| 14:05:27.00 | 42.818525, 141.728250 | 42.818525, 141.728250 | 42.818515, 141.728300 |
| 14:05:28.00 | 42.818534, 141.728253 | 42.818534, 141.728253 | 42.818524, 141.728303 |
| 14:05:29.00 | 42.818543, 141.728256 | 42.818543, 141.728256 | 42.818533, 141.728306 |
| ⋮ | ⋮ | ⋮ | ⋮ |

FIG.24

| RAKE IMPLEMENT INFORMATION ||
|---|---|
| MODEL NO. OF IMPLEMENT | GRASS RANGE INFORMATION L6Y |
| R13513A | 4120 |
| R13515A | 4310 |
| ⋮ | ⋮ |
| R30802G | 4330 |
| R30804G | 4420 |
| ⋮ | ⋮ |

FIG.25

| GRASS INFORMATION | | | | |
|---|---|---|---|---|
| AREA ID | POSITION OF AREA | SPECIES OF GRASS | MOISTURE CONTENT | GROWTH STATE |
| A0019 | 42.818340, 141.728116<br>42.818584, 141.728176<br>42.818524, 141.728512<br>42.818280, 141.728452 | TIMOTHY | 96.5 | A |
| ⋮ | ⋮ | ⋮ | ⋮ | ⋮ |
| A0056 | 42.818907, 141.728235<br>42.819151, 141.728295<br>42.819091, 141.728631<br>42.818847, 141.728571 | ORCHARD GRASS | 89.5 | B |
| ⋮ | ⋮ | ⋮ | ⋮ | ⋮ |

FIG.27

| SECOND SWATH INFORMATION | | | | |
|---|---|---|---|---|
| TIME | POSITION OF SWATH | SPECIES OF GRASS | MOISTURE CONTENT | GROWTH STATE |
| 14:05:20.00 | 42.818462, 141.728229 | TIMOTHY | 96.5 | A |
| 14:05:21.00 | 42.818471, 141.728232 | TIMOTHY | 96.5 | A |
| ⋮ | ⋮ | ⋮ | ⋮ | ⋮ |
| 14:05:41.00 | 42.818653, 141.728286 | TIMOTHY | 93.0 | B |
| 14:05:42.00 | 42.818662, 141.728289 | TIMOTHY | 93.0 | B |
| ⋮ | ⋮ | ⋮ | ⋮ | ⋮ |
| 14:06:04.00 | 42.818858, 141.728361 | TIMOTHY | 95.0 | A |
| 14:06:05.00 | 42.818867, 141.728364 | TIMOTHY | 95.0 | A |
| ⋮ | ⋮ | ⋮ | ⋮ | ⋮ |
| 14:06:23.00 | 42.819029, 141.728418 | ORCHARD GRASS | 89.5 | B |
| 14:05:24.00 | 42.819038, 141.728421 | ORCHARD GRASS | 89.5 | B |
| ⋮ | ⋮ | ⋮ | ⋮ | ⋮ |

FIG.29

| MODEL NO. OF TRACTOR | MODEL NO. OF IMPLEMENT | FIRST POSITIONAL RELATIONSHIP INFORMATION (L7X, L7Y) |
|---|---|---|
| M12312G | R40418D | (-4560, -300) |
| M12312G | R40420D | (-4770, -300) |
| ⋮ | ⋮ | ⋮ |
| M34534W | R40418D | (-4780, -300) |
| M34534W | R40420D | (-4990, -300) |
| ⋮ | ⋮ | ⋮ |

FIG.31

| RAKE IMPLEMENT INFORMATION ||
|---|---|
| MODEL NO. OF IMPLEMENT | GRASS RANGE INFORMATION L8Y |
| R40418D | 7480 |

*FIG.34*

| MODEL NO. OF TRACTOR | MODEL NO. OF IMPLEMENT | POSITIONAL RELATIONSHIP INFORMATION (L9X, L9Y) |
|---|---|---|
| M12312G | B51470A | (-3220, -300) |
| M12312G | B51472A | (-3430, -300) |
| ⋮ | ⋮ | ⋮ |
| M34504W | B51470A | (-3380, -250) |
| M34504W | B51472A | (-3590, -250) |
| ⋮ | ⋮ | ⋮ |

*FIG.35*

| ID | TIME INFORMATION | | BALE POSITION INFORMATION | |
|---|---|---|---|---|
| | START TIME | END TIME | START POSITION | END POSITION |
| 10201 | 17:01:15.10 | | 42.818460, 141.728230 | |
| | | 17:02:12.56 | | 42.818653, 141.728288 |
| 10202 | 17:03:05.28 | | 42.818654, 141.728288 | |
| | | 17:04:02.35 | | 42.818856, 141.728362 |
| 10203 | 17:04:59.51 | | 42.818857, 141.728362 | |
| | | 17:06:03.47 | | 42.819028, 141.728419 |
| 10204 | 17:06:55.32 | | 42.819029, 141.728419 | |
| ⋮ | ⋮ | ⋮ | ⋮ | ⋮ |

*FIG.36*

| | FIRST BALE INFORMATION | | |
|---|---|---|---|
| | GRASS POSITION INFORMATION | | |
| ID | POSITION OF SWATH | POSITION OF FIRST END OF GRASS | POSITION OF SECOND END OF GRASS |
| 10201 | 42.818462, 141.728229 | 42.818472, 141.728179 | 42.818452, 141.728279 |
| | ⋮ | ⋮ | ⋮ |
| | 42.818653, 141.728286 | 42.818663, 141.728236 | 42.818643, 141.728336 |
| 10202 | 42.818654, 141.728287 | 42.818664, 141.728237 | 42.818644, 141.728337 |
| | ⋮ | ⋮ | ⋮ |
| | 42.818858, 141.728361 | 42.818868, 141.728311 | 42.818848, 141.728411 |
| 10203 | 42.818859, 141.728362 | 42.818869, 141.728312 | 42.818849, 141.728412 |
| | ⋮ | ⋮ | ⋮ |
| | 42.819029, 141.728418 | 42.819039, 141.728368 | 42.819019, 141.728468 |
| 10204 | 42.819030, 141.728419 | 42.819040, 141.728369 | 42.819020, 141.728469 |
| | ⋮ | ⋮ | ⋮ |

FIG.37

| ID | SECOND BALE INFORMATION ||||
| | GRASS INFORMATION ||||
| | POSITION OF SWATH | SPECIES OF GRASS | MOISTURE CONTENT | GROWTH STATE |
| --- | --- | --- | --- | --- |
| 10201 | 42.818462, 141.728229 | TIMOTHY | 96.5 | A |
| | ⋮ | ⋮ | ⋮ | ⋮ |
| | 42.818653, 141.728286 | TIMOTHY | 93.0 | B |
| 10202 | 42.818654, 141.728287 | TIMOTHY | 93.0 | B |
| | ⋮ | ⋮ | ⋮ | ⋮ |
| | 42.818858, 141.728361 | TIMOTHY | 95.0 | A |
| 10203 | 42.818859, 141.728362 | TIMOTHY | 95.0 | A |
| | ⋮ | ⋮ | ⋮ | ⋮ |
| | 42.819029, 141.728418 | ORCHARD GRASS | 89.5 | B |
| 10204 | 42.819030, 141.728419 | ORCHARD GRASS | 89.5 | B |
| | ⋮ | ⋮ | ⋮ | ⋮ |

# FARMING SUPPORT SYSTEM, POSITION INFORMATION GENERATION METHOD, COMPUTER PROGRAM, AND PROCESSING DEVICE

CROSS-REFERENCE TO RELATED APPLICATION

This application claims priority to Japanese Patent Application No. 2020-215365, filed on Dec. 24, 2020, the entire contents of which are hereby incorporated by reference.

BACKGROUND OF THE INVENTION

1. Field of the Invention

The present disclosure relates to farming support systems, position information generation methods, computer programs, and processing devices.

2. Description of the Related Art

Research and development of smart agriculture that uses information and communication technology (ICT) and the Internet of things (IoT), as the next-generation agriculture, are under way. Among the smart agriculture technologies being researched and developed is a farming support system that manages information about fields in a centralized manner on a cloud, and provides support in agriculture using data on the cloud. The farming support system allows efficient performance of general tasks required for agricultural operations, such as field management, work scheduling, work recording, management of work progress, and determination of a travel path of a work vehicle.

Grass that is used as livestock feed or the like is typically cultivated in fields, and then reaped and harvested (see, for example, Japanese Laid-Open Patent Publication No. 2019-004729). In grass harvest work, first of all, a tractor with a mower, which is a machine for cutting grass, travels in a field, so that grass grown on the field is cut by the mower. Next, a tractor with a tedder, which is a device for scattering cut grass, travels in the field, so that the cut grass is stirred and dispersed by the tedder. The stirring and dispersion of the grass allows the grass to dry better.

Next, a tractor with a rake implement, which is a device for collecting cut grass, travels in the field, so that the rake implement collects the grass to form a swath (a row of collected grass). Thereafter, a tractor with a baler, which is a device for compressing the cut grass into compact bales travels in the field. The baler collects the grass contained in the swath into itself, and forms a bale having a predetermined shape from the collected grass. The bale, which is a mass of grass, is in the shape of, for example, a cylinder or cuboid. The formation of the bale allows the harvested grass to be easily carried out of the field.

SUMMARY OF THE INVENTION

Farming support systems that manage grass in fields are required to obtain and use information about the positions of swaths in fields.

Preferred embodiments of the present invention provide farming support systems each of which generates position information indicating a position of a swath in a field.

A farming support system according to an illustrative preferred embodiment of the present disclosure includes a first position detector provided in one of a work vehicle and a rake implement attachable to the work vehicle, and a processor configured or programmed to obtain, based on rake implement information about the rake implement, a first positional relationship between a reference point to be positioned by the first position detector and a swath to be formed by the rake implement, in a local coordinate system that is defined for the work vehicle and the rake implement which is attached to the work vehicle. The processor is configured or programmed to generate swath position information indicating a position of the swath in a geographic coordinate system, based on information indicating a position of the reference point in the geographic coordinate system detected by the first position detector during a work of forming the swath, and the first positional relationship.

According to a preferred embodiment of the present disclosure, a positional relationship (geometry) between a reference point and a swath in a local coordinate system (vehicle coordinate system) which is moved together with a work vehicle and a rake implement, is obtained. Based on the obtained positional relationship and a position in a geographic coordinate system detected by a position detector, swath position information indicating the position of a formed swath in the geographic coordinate system is generated. When the positional relationship between the reference point and a swath in the local coordinate system is known, swath position information indicating the position of the formed swath in the geographic coordinate system can be generated using the position detector. When the position of the formed swath in the geographic coordinate system is known, the position of the swath can be "visualized," which facilitates setting of a travel path for a work of forming a bale.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a side view schematically illustrating a tractor and a rake implement according to a preferred embodiment of the present invention.

FIG. 3 is a plan view schematically illustrating a tractor and a rake implement according to a preferred embodiment of the present invention.

FIG. 10 is a diagram illustrating an example of first positional relationship information indicating a positional relationship between a reference point and a position of a swath in a local coordinate system according to a preferred embodiment of the present invention.

FIG. 11 is a diagram illustrating an example of azimuth information, reference point position information, and swath position information according to a preferred embodiment of the present invention.

FIG. 15 is a diagram illustrating an example of work vehicle information and rake implement information according to a preferred embodiment of the present invention.

FIG. 17 is a diagram illustrating an example of an inter-reference position correction value that is information about a positional relationship between two reference positions in a local coordinate system according to a preferred embodiment of the present invention.

FIG. 19 is a diagram illustrating an example of an inter-reference position correction value that is information about a positional relationship between a reference point and a reference position in a local coordinate system according to a preferred embodiment of the present invention.

FIG. 20 is a diagram illustrating an example of geographic coordinates of an end and a center in a transverse direction of a swath according to a preferred embodiment of the present invention.

FIG. 22 is a diagram illustrating an example of rake implement information including grass range information according to a preferred embodiment of the present invention.

FIG. 23 is a diagram illustrating an example of first swath information according to a preferred embodiment of the present invention.

FIG. 24 is a diagram illustrating an example of grass range information for each rake implement model according to a preferred embodiment of the present invention.

FIG. 25 is a diagram illustrating an example of grass information according to a preferred embodiment of the present invention.

FIG. 27 is a diagram illustrating an example of second swath information according to a preferred embodiment of the present invention.

FIG. 29 is a diagram illustrating an example of first positional relationship information indicating a positional relationship between a reference point and a position of a swath in a local coordinate system according to a preferred embodiment of the present invention.

FIG. 31 is a diagram illustrating rake implement information including grass range information according to a preferred embodiment of the present invention.

FIG. 34 is a diagram illustrating an example of second positional relationship information indicating a positional relationship between a reference point and a reference position in a local coordinate system according to a preferred embodiment of the present invention.

FIG. 35 is a diagram illustrating identification information of a bale, time information indicating the start time and end time of formation of the bale, and bale position information according to a preferred embodiment of the present invention.

FIG. 36 is a diagram illustrating an example of first bale information according to a preferred embodiment of the present invention.

FIG. 37 is a diagram illustrating an example of second bale information according to a preferred embodiment of the present invention.

DETAILED DESCRIPTION OF THE PREFERRED EMBODIMENTS

Preferred embodiments of the present disclosure will be described below. To avoid unnecessarily obscuring the present disclosure, well-known features may not be described or substantially the same elements may not be redundantly described, for example. This is for ease of understanding the present disclosure. The present inventor provides the accompanying drawings and the following description to allow a person skilled in the art to thoroughly understand the present disclosure. These are not intended to limit the subject matter as set forth in the appended claims. In the description that follows, like elements are indicated by like reference signs.

The following preferred embodiments are illustrative, and farming support systems according to preferred embodiments of the present disclosure are not limited thereto. For example, numerical values, shapes, materials, steps, and the order of the steps, etc., indicated in the following preferred embodiments are merely illustrative, and various modifications can be made thereto unless a technical contradiction occurs. The preferred embodiments can be used in various combinations unless a technical contradiction occurs.

Figure 1:
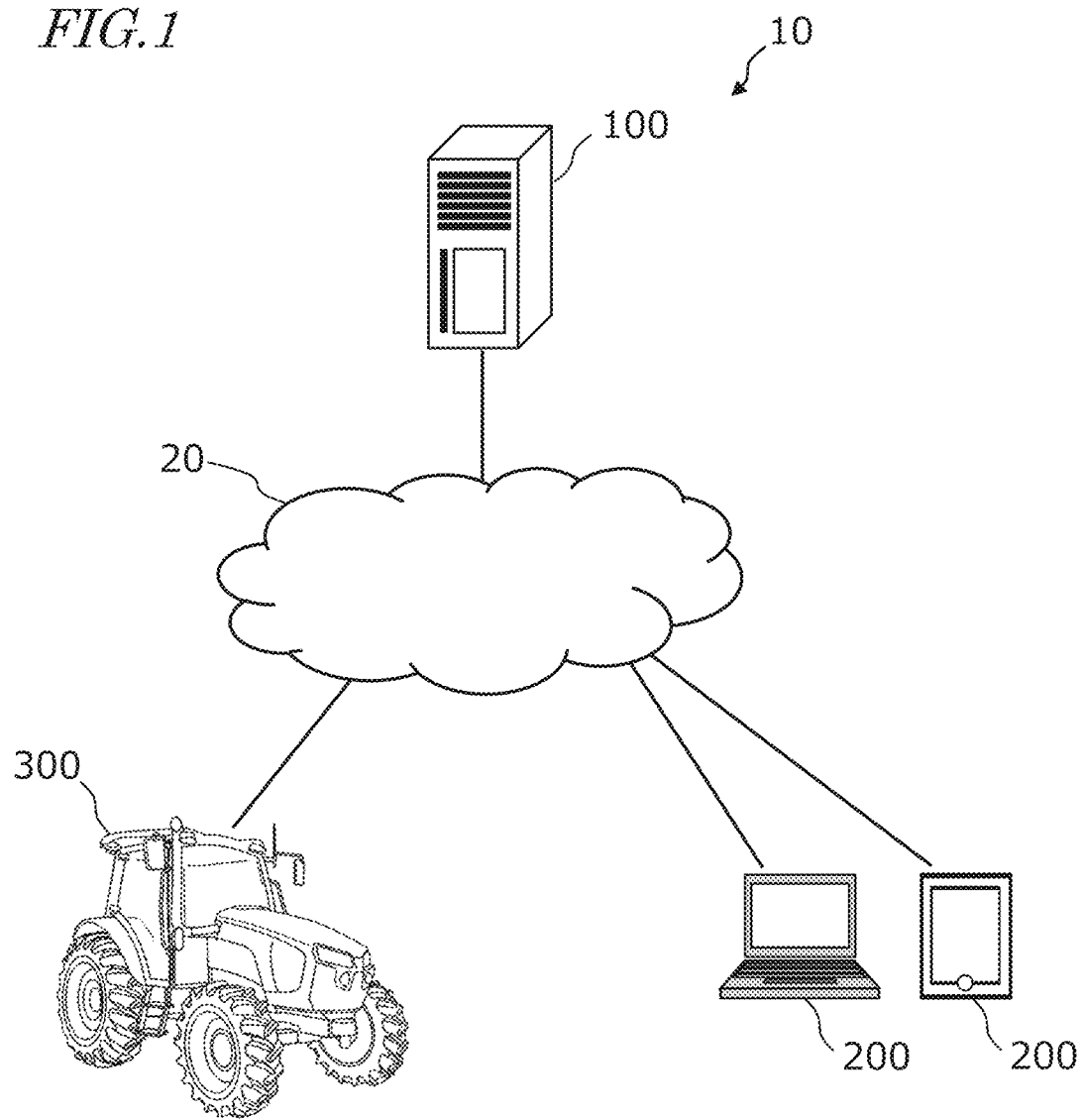
FIG. 1 is a schematic diagram showing an example of a configuration of a farming support system according to a preferred embodiment of the present invention.

FIG. 1 is a schematic diagram showing an example of a configuration of a farming support system 10 according to a preferred embodiment of the present disclosure. The farming support system 10 is capable of performing various functions to support agricultural works related to grass. The farming support system is substantially implemented as a computer system. In the farming support system 10, a server computer 100 (hereinafter denoted as a "server 100"), one or more user terminal devices 200, and one or more work vehicles 300 (e.g., a tractor) can be connected through a network 20 to communicate with each other. The network 20 is, but not limited to, the Internet, for example. The numbers of user terminal devices 200 and work vehicles 300 connected to the network 20 are not particularly limited. FIG. 1 illustrates an example in which two user terminal devices 200, such as a laptop PC and a tablet computer, and one work vehicle 300 are connected to the network 20. The present disclosure is not limited to this. In the description that follows, it is assumed that the work vehicle 300 is a tractor, and the work vehicle 300 is referred to as a "tractor 300."

In the farming support system 10 of this preferred embodiment, management processes related to grass cultivated in a field can be carried out. As described above, in harvesting of grass grown on a field, the grass may be cut using a mower, the cut grass may be stirred and dispersed using a tedder, swaths may be formed using a rake implement, and bales may be formed using a baler. The cutting of grass using a mower and the stirring and dispersion of grass using a tedder can be carried out using conventional techniques, and will not herein be described in detail. In the farming support system 10 of this preferred embodiment, position information indicating a position of a swath formed in a field using a rake implement is generated. Firstly, a tractor and a rake implement will be described.

FIG. 2 is a side view schematically illustrating a tractor 300 and a rake implement 400. FIG. 3 is a plan view schematically illustrating the tractor 300 and the rake implement 400. In this preferred embodiment, the terms "forward," "rearward," "leftward," "rightward," "upward," and "downward" each have a meaning that is defined in relation to a user who is sitting in the driver's seat of a work vehicle, facing the steering wheel. The work vehicle in the present disclosure is not limited to work vehicles that are driven by a user sitting therein. In work vehicles such as an unmanned, automatic-traveling tractor, no driver's seat or steering wheel is always required. In such a work vehicle, the terms "forward" and "rearward" mean the "direction of forward movement" and the "direction of rearward movement," respectively, that are defined as a central direction of steering. The terms "upward" and "downward" mean the "upward direction" and "downward direction," respectively, along the vertical direction. The terms "leftward" and "rightward" mean the "leftward direction" and "rightward direction," respectively, that are defined in relation to a straight line passing through the geometric center of a work vehicle as viewed from above the work vehicle and extending in the "front-back" direction.

The tractor 300 includes a vehicle body 301, an engine 302, and a transmission 303. The vehicle body 301 is provided with a pair of front wheels 304F, a pair of rear wheels 304R, and a cabin 305. In the cabin 305, a steering device 306, a driver's seat 307, and an operation device 340. A position detector 350 is provided in or on a roof 309 at an upper portion of the cabin 305. The position detector 350 is capable of detecting a position (geographic coordinates of a "reference point" described below) of the tractor 300 in a geographic coordinate system. The tractor 300 may include a crawler instead of the front wheel 304F and the rear wheel 304R. The tractor 300 may include a crawler instead of one of the front wheel 304F and the rear wheel 304R.

The engine 302 is, for example, a diesel engine. Instead of the diesel engine, an electric motor may be used. The transmission 303 is capable of changing the propelling force and travel speed of the tractor 300 by changing gear ratios. The transmission 303 is also capable of allowing the tractor 300 to switch between forward movement and rearward movement.

The steering device 306 includes a steering wheel, a steering shaft connected to the steering wheel, and a power steering device that provides support in steering of the steering wheel. The front wheels 304F are each a steered wheel. By changing the steering angle of the front wheels 304F, the direction in which the tractor 300 travels can be changed. The steering angle of the front wheels 304F can be changed by operating the steering wheel. The power steering device includes a hydraulic device or electric motor that supplies an assistive force for changing the steering angle of the front wheels 304F. When automatic traveling or automatic steering is performed, the steering angle can be automatically adjusted by the force of a hydraulic device or electric motor under the control of an electronic control unit (ECU) provided in the tractor 300.

A coupling device 308 is provided at a rear portion of the vehicle body 301. The coupling device 308 includes, for example, a three-point hitch (also referred to as a three-point linkage), a power take-off (PTO) shaft, and a universal joint. The coupling device 308 can be used to removably attach an implement to the tractor 300. In the examples illustrated in FIGS. 2 and 3, the implement is the rake implement 400. The rake implement 400 collects grass in a field to form a swath.

Power can be transmitted from the tractor 300 to the rake implement 400 through the PTO shaft and the universal joint. When the rake implement 400 is attached to the three-point hitch, the position or orientation of the rake implement 400 can be controlled by lifting or lowering the three-point hitch using, for example, a hydraulic device. The rake implement 400 is drawn and moved by the tractor 300 to form a swath.

The rake implement 400 includes a frame 401 that is coupled to the coupling device 308 of the tractor 300, a grass collector 402, and a pair of wheels 409. The grass collector 402 includes a body 403 that is attached to the frame 401, a rotating shaft 404 that is rotatably supported by the body 403, a plurality of tine arms 405 connected to the rotating shaft 404, and a wheel 419. Each tine arm 405 is provided with a plurality of tines 406. The tine 406 is a member having a bifurcated tip. The rotation of the PTO shaft of the tractor 300 is transmitted to the rotating shaft 404 through a drive shaft supported by the frame 401, so that the rotating shaft 404 is rotated. The rotation of the rotating shaft 404 drives the plurality of tine arms 405 to rotate, so that grass is collected by the tines 406.

In the example illustrated in FIG. 3, a screen 408 is disposed on the left side of the grass collector 402 and spaced a predetermined distance apart from the grass collector 402. The screen 408 is supported by a supporting arm 407 extending from the frame 401. The plurality of tine arms 405 of the grass collector 402 collect grass while rotating anticlockwise as viewed from above the rake implement 400. The screen 408 receives the grass collected by the grass collector 402, so that a swath is formed between the grass collector 402 and the screen 408.

The structure of the rake implement 400 is not limited to that described above, and may be any device that collects grass to form a swath. For example, the rake implement 400 may include two or more grass collectors 402. The grass collector 402 may be a rotary device in which the rotating shaft 404 extends generally in parallel to a plane spreading in the forward, rearward, leftward, and rightward directions, or a belt/chain device in which a plurality of tines 406 are attached to a rotating belt or chain, or other types of devices. Next, a baler will be described.

Figure 4:
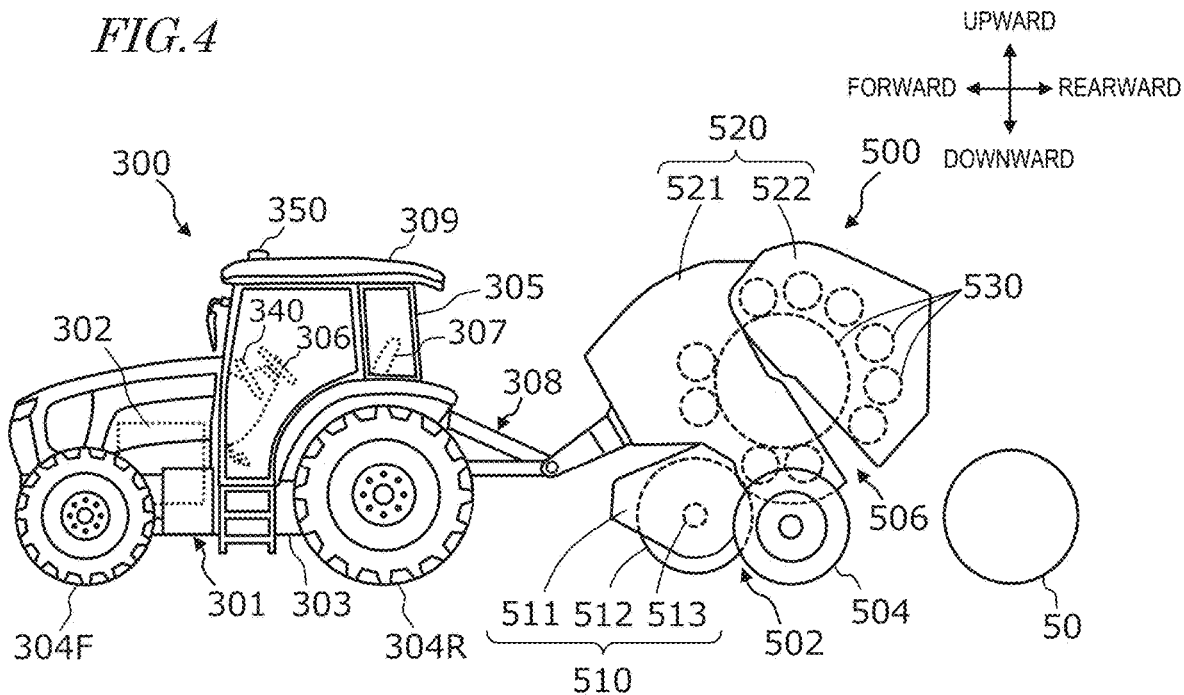
FIG. 4 is a side view schematically illustrating a tractor and a baler according to a preferred embodiment of the present invention.
Figure 5:
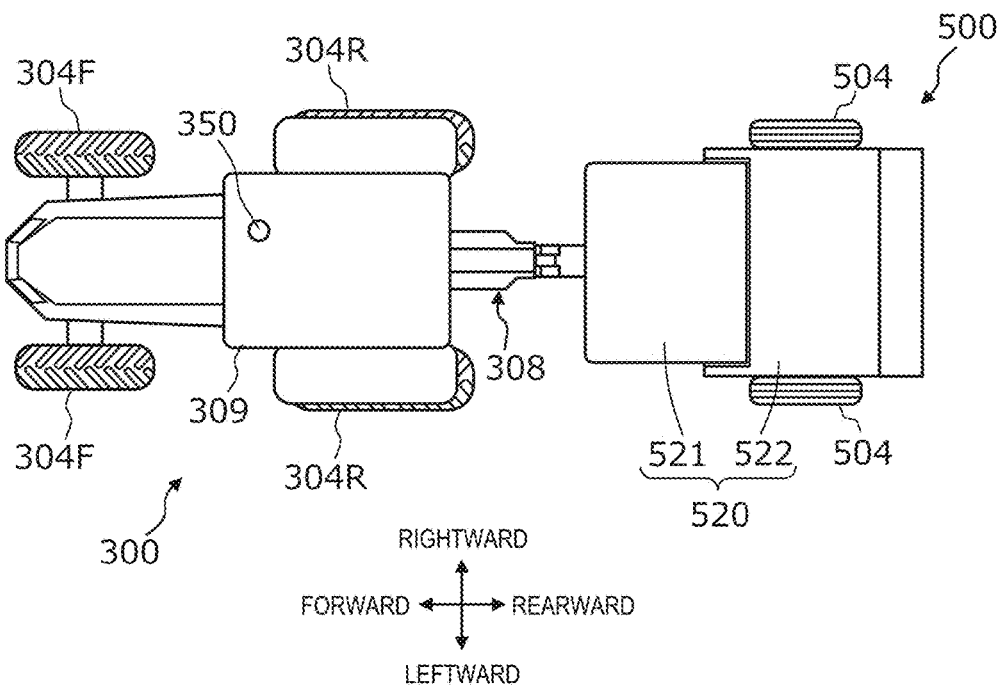
FIG. 5 is a plan view schematically illustrating a tractor and a baler according to a preferred embodiment of the present invention.

FIG. 4 is a side view schematically illustrating a tractor 300 and a baler 500. FIG. 5 is a plan view schematically illustrating the tractor 300 and the baler 500. The baler 500 can be drawn by the tractor 300 to collect grass contained in a swath, and can shape the collected grass into a predetermined shape to form a bale. Examples of the baler 500 include round balers, whole crops, and hay balers. In FIGS. 4 and 5, a round baler is illustrated as the baler 500.

The baler 500 includes a vehicle body 502 that is coupled to the coupling device 308 of the tractor 300, and an pick-up part 510 that is supported by the vehicle body 502. The vehicle body 502 is provided with wheels 504. The pick-up part 510 picks up grass from the front (on the side that the tractor 300 is positioned), a casing 511 that is open to the front, a rotating shaft 513 that is supported by the casing 511, and a guide tool 512 that is fixed to the rotating shaft 513. The rotation of the guide tool 512 allows grass in a field to be loaded into the casing 511.

The baler 500 includes a chamber 520 that is supported by the vehicle body 502, and a forming part 530 that is disposed in the chamber 520. Grass picked up by the pick-up part 510 is loaded into the chamber 520. The chamber 520 has a first compartment 521 that is fixed to the vehicle body 502, and a second compartment 522 that is allowed to pivot in relation to the first compartment 521. The first compartment 521 is in communication with the pick-up part 510 so that grass picked up by the pick-up part 510 is loaded into the chamber 520.

The forming part 530 shapes grass that has been loaded into the chamber 520. The forming part 530 forms a round bale 50 using, for example, a plurality of rotating rollers. The forming part 530 may be a chain device that shapes grass into a roll using a chain, a belt device that shapes grass into a roll using a belt, or other types of devices.

When the second compartment 522 is pivoted upward in relation to the first compartment 521, a discharge opening 506 is formed between the first compartment 521 and the second compartment 522. The bale 50 formed by the forming part 530 is discharged from the discharge opening 506.

It should be noted that the coupling device 308 of the tractor 300 may be provided at a front portion of the vehicle body 301. In that case, an implement such as a rake implement or a baler is coupled to the front portion of the tractor 300.

Figure 6:
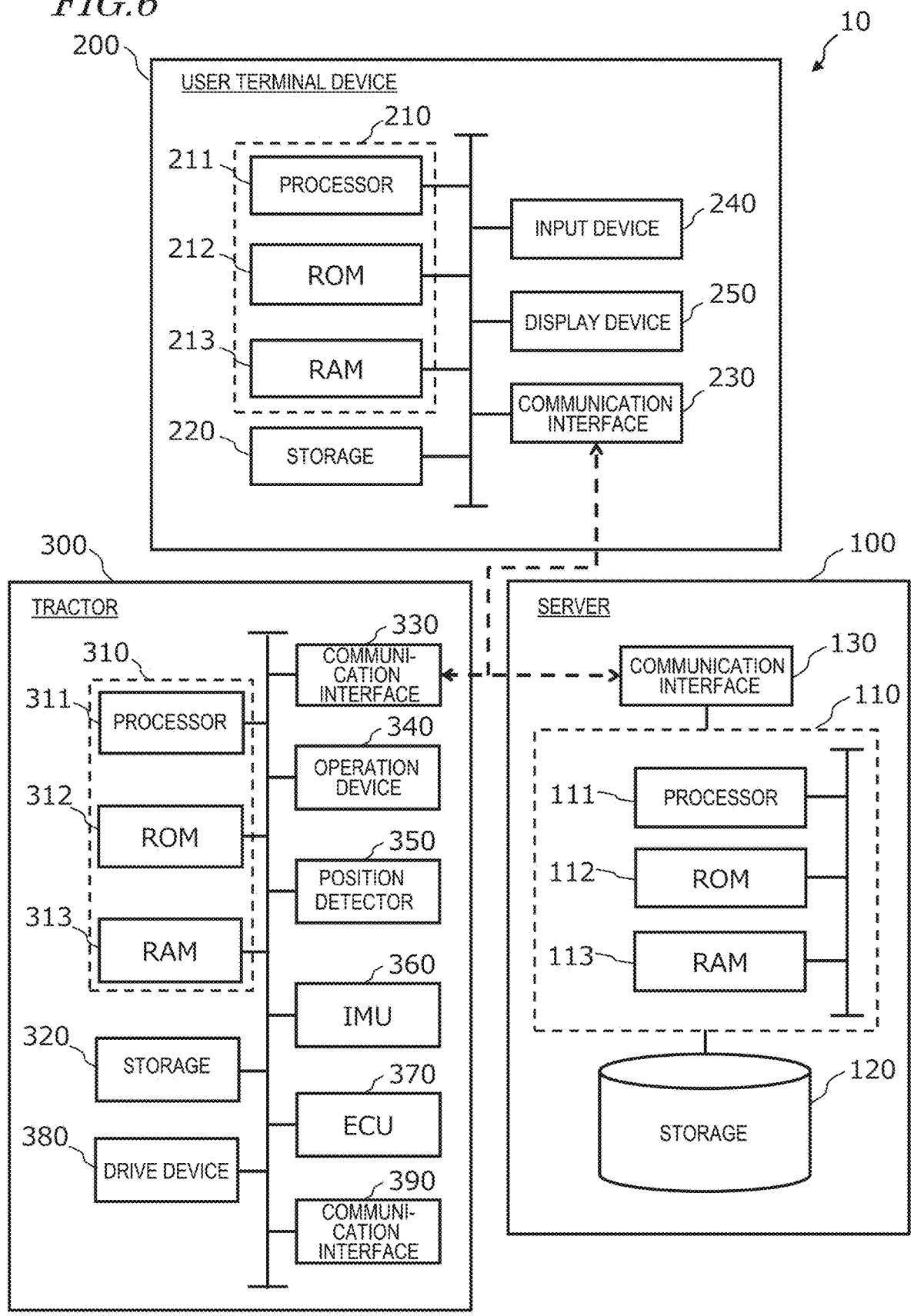
FIG. 6 is a block diagram illustrating an example of a hardware configuration of a farming support system according to a preferred embodiment of the present invention.
Figure 7:
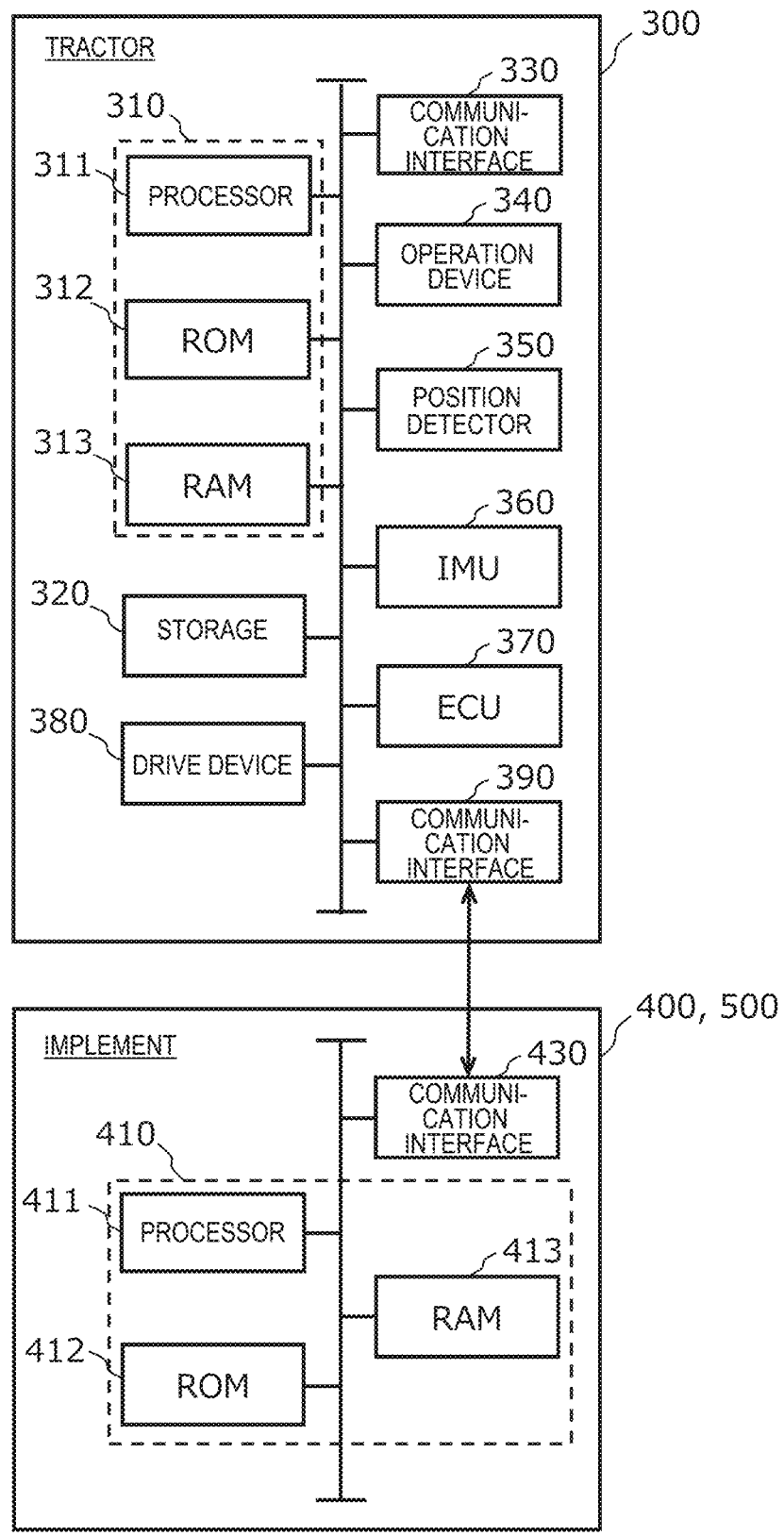
FIG. 7 is a block diagram illustrating an example of a hardware configuration of a tractor, a rake implement, and a baler according to a preferred embodiment of the present invention.

Next, an example of a hardware configuration of the farming support system 10 will be described. FIG. 6 is a block diagram illustrating an example of a hardware configuration of the farming support system 10. FIG. 7 is a block diagram illustrating an example of a hardware configuration of the tractor 300, the rake implement 400, and the baler 500.

The server 100 may be a computer that is provided away from the tractor 300, such as a cloud server or edge server. The server 100 includes a processing device 110, a storage 120, and a communication interface 130. The server 100 serves as a cloud server that manages information about fields in a centralized manner, and provides support in agriculture using the managed data.

The processing device 110 includes a processor 111, and storage media such as a read only memory (ROM) 112 and a random access memory (RAM) 113. The ROM 112 may store a computer program (or firmware) that causes the processor 111 to execute processes. The computer program may be provided to the server 100 through a storage medium (e.g., a semiconductor memory or optical disc) or an electrical communication line (e.g., the Internet). Such a computer program may be made commercially available as commercial software.

The processor 111 is a semiconductor integrated circuit such as a central processing unit (CPU). The processor 111 may be implemented by a microprocessor or microcontroller. The processor 111 sequentially executes the computer program stored in the ROM 112, in which instructions for executing various processes are written, to carry out the desired processes.

The processor 111 may be a field programmable gate array (FPGA), graphics processing unit (GPU), application specific integrated circuit (ASIC), or application specific standard product (ASSP) with a CPU mounted thereon, or a combination of two or more selected from these circuits.

The ROM 112 is, for example, a writable memory (e.g., a PROM), a rewritable memory (e.g., a flash memory), or a read-only memory. The ROM 112 stores a computer program that controls operations of the processor 111. The ROM 112 may not necessarily be a single storage medium, or may be a set of storage media. A portion of the set of storage media may be removable.

The RAM 113 provides a work area into which the computer program of the ROM 112 will be temporarily loaded during boot-up. The RAM 113 may not necessarily be a single storage medium, and may be a set of storage media.

The storage 120 mainly serves as a storage for a database. The storage 120 is, for example, a cloud storage. The storage 120 is, for example, a magnetic storage, an optical storage, a semiconductor storage, or a combination thereof. Examples of the optical storage include optical disk drives and magneto-optical disk (MD) drives. Examples of the magnetic storage include hard disk drives (HDDs). Examples of the semiconductor storage include solid-state drives (SSDs). The storage 120 may be an external storage connected to the server 100 through a network. The storage 120 may store various kinds of information such as information about the map of a field, rake implement information about a rake implement, and position information about the position of a swath, which are described below.

The communication interface 130 is a communication module for communication with the user terminal device 200 and the tractor 300 through the network 20. The communication interface 130 allows wired communication and/or wireless communication. The communication interface 130 allows wired communication compliant with a communication standard, such as USB, IEEE 1394 (registered trademark), or Ethernet (registered trademark). The communication interface 130 allows wireless communication compliant with, for example, the Bluetooth (registered trademark) standard and/or the Wi-Fi (registered trademark) standard. These standards include a wireless communication standard that uses the 2.4 GHz or 5.0 GHz frequency band. The communication interface 130 may allow wireless communication that uses a mobile-phone network or a satellite communication system.

The user terminal device 200 is, for example, a personal computer (PC), tablet computer, smartphone, or personal digital assistant (PDA). In FIG. 1, a laptop PC and a tablet computer are illustrated as an example of the user terminal device 200.

As illustrated in FIG. 6, the user terminal device 200 includes a processing device 210, a storage 220, a communication interface 230, an input device 240, and a display device 250. These elements are connected through a bus so as to communicate with each other.

The processing device 210 includes a processor 211, a ROM 212, and a RAM 213. The processor 211, the ROM 212, the RAM 213, and the storage 220 are similar to the processor 111, the ROM 112, the RAM 113, and the storage 120 of the server 100, and therefore, will not herein be described in detail.

The input device 240 converts instructions from the user into data, which are in turn input to the computer. The input device 240 is, for example, a keyboard, a mouse, a touch panel, or a combination thereof. The display device 250 is, for example, a liquid crystal display or an organic light-emitting diode (OLED) display.

The communication interface 230 is a communication module for communication with the server 100 and the tractor 300 through the network 20. The communication interface 130 allows wired communication and/or wireless communication. For example, as with the communication interface 130, the communication interface 230 allows wired communication compliant with a communication standard, such as USB, IEEE 1394 (registered trademark), or Ethernet (registered trademark). As with the communication interface 130, the communication interface 230 allows wireless communication compliant with the Bluetooth (registered trademark) standard and/or the Wi-Fi (registered trademark) standard. The communication interface 230 may be a communication module that allows wireless communication compliant with the Bluetooth Low Energy (BLE) or Low Power Wide Area (LPWA) communication technology. The communication technology such as BLE or LPWA can be used to implement long-range and wide-area communication with low power consumption. The communication interface 230 may allow wireless communication that uses a mobile-phone network or a satellite communication system.

As illustrated in FIG. 6, the tractor 300 includes a processing device 310, a storage 320, a communication interface 330, an operation device 340, a position detector 350, an inertial measurement device (IMU) 360, an electronic control unit 370, a drive device 380, and a communication interface 390. These elements are connected through a bus so as to communicate with each other.

The processing device 310 includes a processor 311, a ROM 312, and a RAM 313. The processor 311, the ROM 312, the RAM 313, and the storage 320 are similar to the processor 111, the ROM 112, the RAM 113, and the storage 120 of the server 100, and therefore, will not herein be described in detail.

The communication interface 330 is a communication module for communication with the server 100 and the user terminal device 200 through the network 20. The communication interface 330 allows wireless communication compliant with, for example, the Bluetooth (registered trademark) standard and/or the Wi-Fi (registered trademark) standard. The communication interface 330 may be a communication module that allows wireless communication that uses the BLE or LPWA communication technology. The communication interface 330 may allow wireless communication that uses a mobile-phone network or a satellite communication system.

The operation device 340 is used by the user to perform operations related to various movements of the tractor 300. The operation device 340 may include a virtual terminal (VT). For example, the user uses the operation device 340 to perform operations related to automatic traveling or automatic steering of the tractor 300. The operation device 340 may include a display device such as a touchscreen and/or one or more switches. By operating the operation device 340, the user can perform various operations such as on/off switching of the automatic traveling mode or the automatic steering mode, setting of the initial position of the tractor 300, setting of a path, recording or editing of an environmental map, and on/off switching of works performed by an implement (implement). The operation device 340 may also display various kinds of information such as operation states of a work vehicle and an implement.

The position detector 350 is capable of detecting the position (geographic coordinates) of the tractor 300 in a geographic coordinate system. The term "geographic coordinates" indicates a position in, for example, a geographic coordinate system in which positions on Earth are represented using a latitude and a longitude, or a projected coordinate system in which three-dimensional coordinates on Earth are projected onto a two-dimensional plane, and positions on Earth are represented using X-Y coordinates. In Japan, geographic coordinates may be represented using coordinates in the planar orthogonal coordinate system defined in the Survey Act.

The position detector 350 includes an antenna that receives a global navigation satellite system (GNSS) signal from a GNSS satellite, and a processing circuit. The position detector 350 receives a GNSS signal from a GNSS satellite, and performs positioning based on the GNSS signal. GNSS collectively refers to satellite-based positioning systems, such as the global positioning system (GPS), the quasi-zenith satellite system (QZSS, for example, Michibiki), GLONASS, Galileo, and BeiDou.

The position detector 350 performs interference positioning, such as real-time kinematic (RTK) GPS. In the case of RTK positioning, the position detector 350 includes an RTK receiver. The position detector 350 receives a GNSS signal transmitted from a GNSS satellite and a correction signal transmitted from a reference station, and performs positioning based on these signals. Interference positioning, such as RTK positioning, allows positioning that provides an accuracy such that position errors are a few centimeters. The high-precision positioning generates position information containing information about a latitude, a longitude, and an altitude.

Any position detecting technique that can provide position information having a required accuracy (interference positioning, relative positioning, etc.) may be used. For example, position detecting may also be performed using a virtual reference station (VRS) or a differential global positioning system (DGPS). In the case in which position information having a required accuracy is obtained without the aid of a correction signal transmitted from a reference station, the correction signal may not be used to generate position information.

The IMU 360 includes an acceleration sensor, an angular acceleration sensor, and a magnetic sensor, and outputs a signal indicating an movement amount, an orientation, and an attitude. For example, the IMU 360 includes a triaxial acceleration sensor and a triaxial gyroscope. The IMU 360 can serve as a motion sensor which outputs a signal indicating various quantities of the tractor 300, such as an acceleration, velocity, displacement, orientation, and attitude. The IMU 360 outputs such a signal at a frequency of several tens to several thousands of times per second, for example. Instead of the IMU 360, a triaxial acceleration sensor, a triaxial gyroscope, and a magnetic sensor may be separately provided. The position detector 350 and the IMU 360 may be integrated into a single unit, which is in turn provided in the tractor 300.

The drive device 380 includes various devices required for traveling of the tractor 300 and driving of the implements 400 and 500, such as the engine 302, the transmission 303, the steering device 306, the coupling device 308, etc., of the tractor 300. The engine 302 includes an internal combustion engine, such as a diesel engine. The drive device 380 may include an electric motor for traction in addition to or instead of the internal combustion engine.

The ECU 370 controls operations of the drive device 380. The ECU 370 controls operations of the drive device 380, based on signals output from the position detector 350 and the IMU 360, and a preset planned travel path, etc. The ECU 370 may be implemented by a plurality of ECUs. The ECU 370 may include the processing device 310.

As illustrated in FIG. 7, the rake implement 400 includes a processing device 410 and a communication interface 430. These elements are connected through a bus so as to communicate with each other. The processing device 410 includes a processor 411, a ROM 412, and a RAM 413. The processor 411, the ROM 412, and the RAM 413 are similar to the processor 311, the ROM 312, and the RAM 313 of the tractor 300, and therefore, will not herein be described in detail.

The communication interface 390 of the tractor 300 and the communication interface 430 of the rake implement 400 are a communication module for communication between the tractor 300 and the rake implement 400. For example, in the case of communication compliant with a communication control standard such as ISOBUS based on ISO 11783, bidirectional communication can be carried out between the tractor 300 and the rake implement 400. In the case in which the tractor 300 and the rake implement 400 support a tractor-implement management (TIM) system, such as ISOBUS-TIM, the rake implement 400 can be controlled from the tractor 300, and vice versa. These communications are either wired communication or wireless communication.

As with the rake implement 400, the baler 500 includes a processing device 410 and a communication interface 430. As with the rake implement 400, the baler 500 may perform, with the tractor 300, communication compliant with a communication control standard such as ISOBUS. In the case in which the tractor 300 and the baler 500 support the TIM system, the baler 500 can be controlled from the tractor 300, and vice versa.

Next, operations of the farming support system 10 will be described in detail. Firstly, an operation of generating swath position information indicating the position of a swath will be described.

As described above with reference to FIGS. 2 and 3, the tractor 300 is provided with the position detector 350. The position detector 350 of this preferred embodiment performs positioning based on a GNSS signal transmitted from a GNSS satellite and a correction signal transmitted from a reference station to generate position information. The position detector 350 detects the position of a predetermined point (reference point) in the tractor 300 such as the position where the position detector 350 is disposed. As described above with reference to FIG. 3, a swath is to be formed between the grass collector 402 and the screen 408 of the rake implement 400. There is a deviation between the position detected by the position detector 350 and the position of the swath formed by the rake implement 400. Therefore, in this preferred embodiment, the position information output by the position detector 350 is corrected so as to identify the position of the swath.

A plurality of types of rake implements may be attached to the tractor 300. Different rake implements have different body sizes and different positions where a swath is formed. Therefore, the position information may be corrected in different manners for different rake implement models.

After a swath is formed by the rake implement 400, the baler 500 (FIG. 4) forms a bale 50. If the position information of the swath in the field has been obtained, the travel path (guidance line) of the tractor 300 and the baler 500 can be set based on that position information. If the map of the field is displayed together with the position of the swath on the display device, the user can visually recognize the position of the swath.

Figure 8:
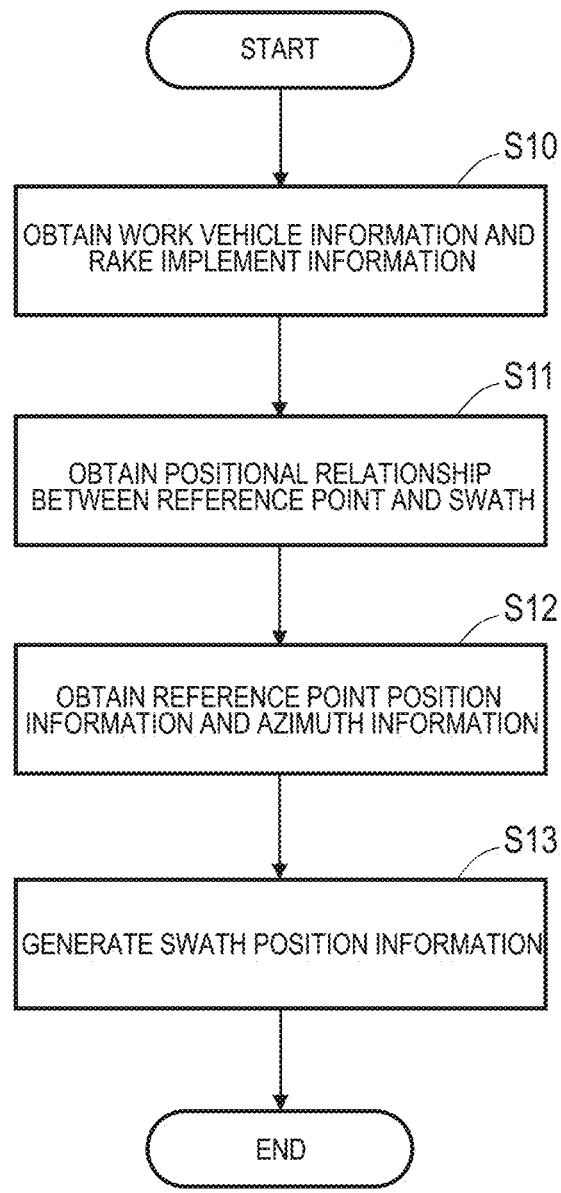
FIG. 8 is a flowchart illustrating an example of a process of generating swath position information according to a preferred embodiment of the present invention.

FIG. 8 is a flowchart illustrating an example of a process of generating swath position information.

The process of FIG. 8 is mainly executed by the processing device 110 (FIG. 6) of the server 100. The processing device 110 initially obtains work vehicle information about a tractor 300, and rake implement information about a rake implement 400 attached to the tractor 300 (step S10). The work vehicle information includes specific information that can be used to identify, for example, the model of the tractor 300. The specific information includes, for example, the model number of the tractor 300. The rake implement information includes specific information that can be used to identify, for example, the model of the rake implement 400. The specific information includes, for example, the model number of the rake implement 400.

The rake implement information is previously stored in a storage (e.g., the ROM 412 (FIG. 7)) included in the rake implement 400. As described above, the tractor 300 and the rake implement 400 are capable of performing communication compliant with a communication control standard, such as ISOBUS.

When the rake implement 400 is attached to the tractor 300, the processor 411 reads the rake implement information from the ROM 412, and outputs the rake implement information to the communication interface 430. The rake implement information is transmitted from the communication interface 430 to the communication interface 390 of the tractor 300. The communication interface 390 receives and outputs the rake implement information to the processor 311. The processor 311 outputs the received rake implement information to the server 100 through the communication interface 330 (FIG. 6).

The work vehicle information is previously stored in a storage (e.g., the ROM 312 or the storage 320) included in the tractor 300. The processor 311 reads the work vehicle information from the ROM 312 or the storage 320, and outputs the work vehicle information to the server 100 through the communication interface 330. The processor 111 of the server 100 stores the received work vehicle information and rake implement information in the storage 120.

Based on the work vehicle information and the rake implement information, the processor 111 obtains information about a positional relationship between a reference point to be positioned by the position detector 350 and a swath 40 to be formed by the rake implement 400, in a local coordinate system that is defined for the tractor 300 and the rake implement 400 when the tractor 300 and the rake implement 400 are attached together (step S11). The local coordinate system is moved together with the tractor 300 and the rake implement 400. The local coordinate system is also referred to as a vehicle coordinate system.

Figure 9:
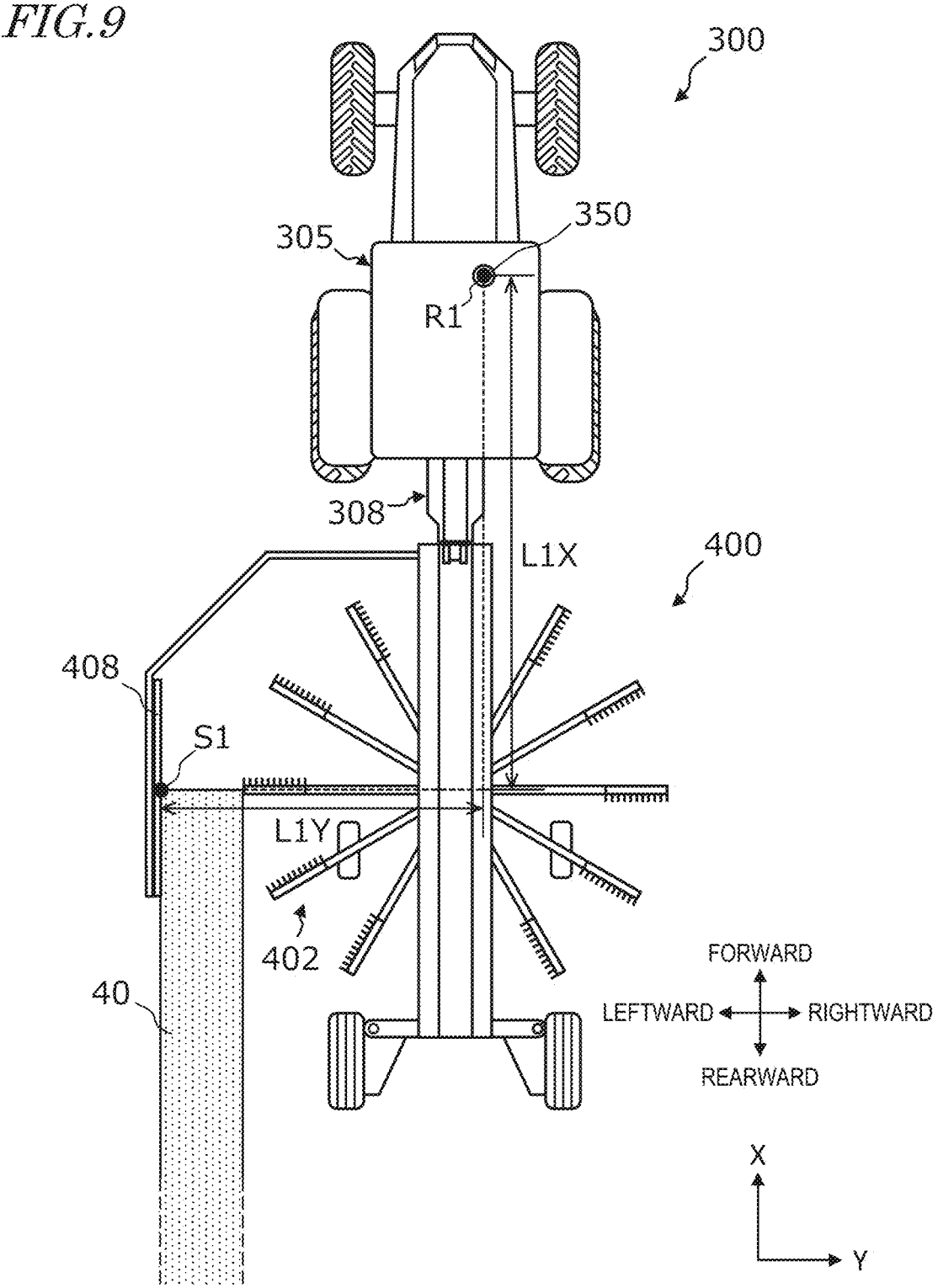
FIG. 9 is a diagram illustrating a positional relationship between a reference point and a swath in a local coordinate system according to a preferred embodiment of the present invention.

FIG. 9 is a diagram illustrating a positional relationship between the reference point R1 and the swath 40 in the local coordinate system. In the local coordinate system of the present disclosure, the X and Y directions are defined as the longitudinal (front-back) and lateral (left-right) directions, respectively, of the tractor 300 and the rake implement 400 when the tractor 300 and the rake implement 400 are attached together and travel straight on a flat ground. The +X direction is defined as a direction from back to front, and the +Y direction is defined as a direction from left to right. Concerning device geometry, ISO 11783 indicates that "the X axis is specified as positive in normal driving direction," and "the Y axis is specified as positive to the right of the normal driving direction." The X and Y directions in the local coordinate system of the present disclosure are defined based on the definitions of device geometry. The unit of coordinate values in the local coordinate system is not particularly limited, and is herein, for example, millimeters.

In the local coordinate system of the tractor 300 alone and the local coordinate system of the rake implement 400 alone, the X and Y directions and the unit of coordinate values are defined in a manner similar to that described above.

The reference point R1 in the local coordinate system may be set at any position in the tractor 300. In the example illustrated in FIG. 9, the reference point R1 is set at the position where the position detector 350 is disposed. The swath 40 is to be formed between the grass collector 402 and the screen 408 of the rake implement 400. In the example illustrated in FIG. 9, a position S1 of the swath 40 is set at a position on the screen 408 that is opposite the grass collector 402.

As illustrated in FIG. 9, the position S1 of the swath 40 is located a length of L1X behind the reference point R1, and a length of L1Y to the left of the reference point R1. When the values of L1X and L1Y are known, the position of the swath 40 in the geographic coordinate system can be calculated from the position information of the reference point R1 detected by the position detector 350.

FIG. 10 is a diagram illustrating an example of first positional relationship information indicating a positional relationship (first positional relationship) between the reference point R1 and the position S1 of the swath 40 in the local coordinate system. The first positional relationship information is previously stored in the storage 120 of the server 100. When the models of the tractor and the rake implement are known, the values of L1X and L1Y can be previously specified. The values of L1X and L1Y may be previously specified for each of combinations of a plurality of tractor models and a plurality of rake implement models. The values of L1X and L1Y may be actually measured, or may be calculated based on the design values. The model of each tractor and the model of each rake implement may, for example, be represented by a model number (no.). The first positional relationship information of FIG. 10 indicates a positional relationship for each of combinations of a plurality of tractor models and a plurality of rake implement models. The positional relationship is based on the reference point R1, and therefore, the values of L1X and L1Y are negative.

For example, in the case in which the model number of the tractor 300 is "M12312G" and the model number of the rake implement 400 is "R13513A," the processor 111 reads the first positional relationship information associated with the combination of these model numbers from the storage 120. In the case in which the model number of the tractor 300 is "M12312G" and the model number of the rake implement 400 is "R13513A," the positional relationship is represented by (L1X, L1Y)=(−4560, −2850). This positional relationship indicates that in the local coordinate system, the position S1 of the swath 40 is located 4560 mm behind the reference point R1 and 2850 mm to the left of the reference point R1.

During the work of forming the swath 40 using the rake implement 400, the position detector 350 detects the position of the reference point R1 in the geographic coordinate system, while the IMU 360 (FIG. 6) detects the azimuth of the travel direction of the tractor 300. The position in the geographic coordinate system is, for example, represented by a latitude and a longitude. The azimuth is, for example, represented by a clockwise angle with reference to true north. The processor 311 of the tractor 300 generates reference point position information indicating the position of the reference point R1 and azimuth information indicating the azimuth of the travel direction using output signals of the position detector 350 and the IMU 360. The processor 311 outputs the reference point position information and the azimuth information together with time information indicating the time that the position of the reference point R1 and the azimuth of the travel direction were detected to the server 100. The time information is, for example, generated by the processor 311, or alternatively, may be generated by other devices. The processor 111 of the server 100 stores the received reference point position information, azimuth information, and time information in the storage 120 (step S12 of FIG. 8).

The processor 111 calculates the position S1 of the swath 40 in the geographic coordinate system using the reference point position information, the azimuth information, and the first positional relationship information (FIG. 10), and generates swath position information indicating the position of the swath 40 in the geographic coordinate system (step S13).

FIG. 11 is a diagram illustrating an example of the azimuth information, the reference point position information, and the swath position information. For ease of understanding, FIG. 11 shows the azimuth, the position of the reference point R1, and the position S1 of the swath 40 taken at intervals of one second.

The intervals at which the position detector 350 detects the position are not particularly limited, and may be one second, for example. The intervals at which the position detector 350 detects the position are either shorter or longer than one second. During the period of time between when the position detector 350 detects the position and when the position detector 350 next detects the position, the position may be estimated using an output signal of the IMU 360 to interpolate the reference point position information.

As described above, the IMU 360 is capable of outputting a signal indicating the attitude of the tractor 300. In the case in which the travel path has undulations and slopes, the attitudes of the tractor 300 and the rake implement 400 may be tilted, so that a deviation may occur in geographic coordinates detected by the position detector 350. The processor 111 may correct the geographic coordinates according to the magnitude of the tilt of the tractor 300 obtained from an output signal of the IMU 360.

The processor 111 converts the positional relationship (FIG. 10) between the reference point R1 and the position S1 of the swath 40 in the local coordinate system into a positional relationship in the geographic coordinate system using the azimuth information. The processor 111 can calculate the latitude and longitude of the position S1 of the swath 40 using the converted positional relationship and the latitude and longitude of the reference point R1. The swath position information indicates the calculated latitude and longitude of the position S1 of the swath 40. Information indicating the latitude and longitude of the reference point R1 at a time point can be used to calculate the latitude and longitude of the position S1 of the swath 40 at the same time point.

The rake implement 400 of FIG. 9 forms the swath 40 on the left side of the rake implement 400. After forming one swath 40 in a field, the tractor 300 and the rake implement 400 may turn to the left, and travels along the swath 40 that was formed immediately before to newly form another swath 40. In that case, the two swaths can be joined together to form a single swath.

Figure 12:
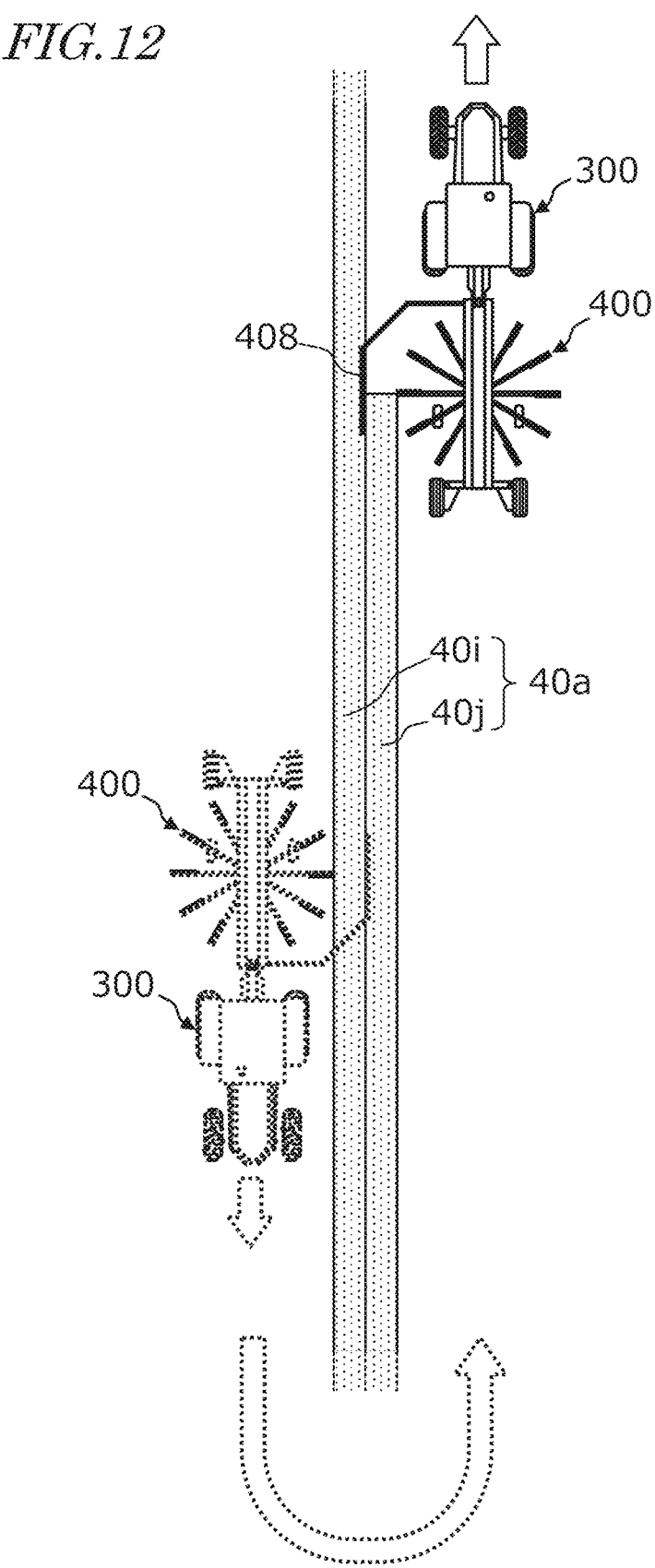
FIG. 12 is a diagram illustrating a single swath formed by joining two swaths together according to a preferred embodiment of the present invention.

FIG. 12 is a diagram illustrating a single swath 40a formed by joining two swaths 40i and 40j together. After the production of the swath 40i of FIG. 12, the tractor 300 and the rake implement 400 turn to the left. The other swath 40j is newly formed with the screen 408 being brought into contact with an end of the swath 40i, so that the single swath 40a can be formed in which the swaths 40i and 40j are joined together.

As the swath position information of the swath 40a, the swath position information of one of the swaths 40i and 40j may be used. The processor 111 may calculate a position between the positions of the swaths 40i and 40j indicated by the swath position information to generate the swath position information of the swath 40a.

The processes of steps S10 to S13 of FIG. 8 may be performed either during the work of forming the swath 40 or after completion of the work of forming the swath 40. In the case in which the processes of steps S10 to S13 are performed after completion of the work of forming the swath 40, the processor 311 of the tractor 300 (FIG. 6) previously stores the reference point position information, the azimuth information, and the time information in the storage 320. After completion of the work of forming the swath 40, the processor 311 reads the work vehicle information, the rake implement information, the reference point position information, azimuth information, and the time information from the storage 320, and outputs these pieces of information to the server 100. The processor 111 of the server 100 may perform the processes of steps S10 to S13 using the received information to generate the swath position information.

As described above, in this preferred embodiment, the positional relationship (geometry) between the reference point R1 and the swath 40 in the local coordinate system (vehicle coordinate system), which is moved together with the tractor 300 and the rake implement 400, is obtained. Based on the obtained positional relationship and the position in the geographic coordinate system detected by the position detector 350, the swath position information indicating the position of the formed swath 40 in the geographic coordinate system is generated. When the positional relationship between the reference point R1 and the swath 40 in the local coordinate system is known, the swath position information indicating the position of the formed swath 40 in the geographic coordinate system can be generated using the position detector 350.

When the position of the formed swath 40 in the geographic coordinate system is known, the position of the swath 40 can be "visualized," which facilitates setting of a travel path for the work of forming the bale 50.

During the work of forming the swath 40, the swath position information can be obtained using information about the position detected by the position detector 350. Therefore, it is not necessary to separately perform the work of measuring the position of the swath 40 using a sensor and a camera, etc., after the formation of the swath 40.

If a map of the field indicating the position of the swath is displayed or visualized on the display device 250 of the user terminal device 200 (FIG. 6), the user is allowed to visually recognize the position of the swath.

Figure 13:
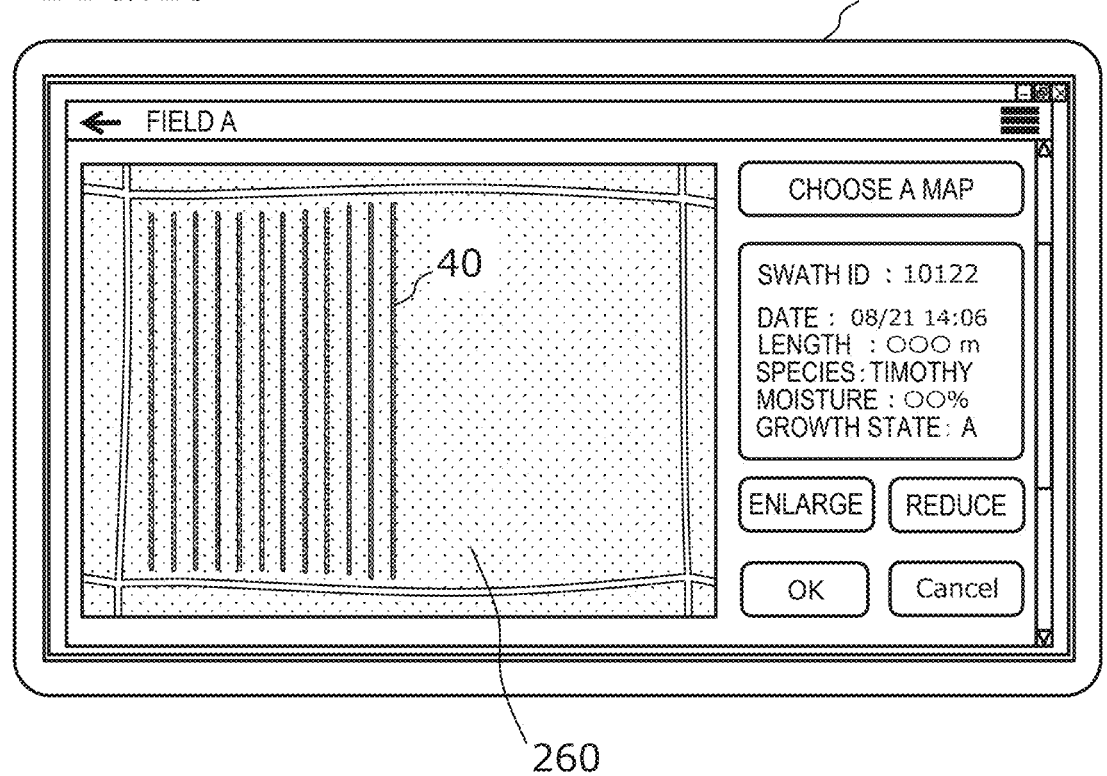
FIG. 13 is a diagram illustrating a display device displaying a map of a field indicating a position of a swath according to a preferred embodiment of the present invention.

FIG. 13 is a diagram illustrating the display device 250 when a field map 260 indicating the position of the swath 40 is displayed on the display device 250. The storage 120 of the server 100 previously stores map information of a field. The map information includes information about geographic coordinates of areas indicated by a map. The processor 111 associates coordinates indicated by the swath position information with the map information to generate swath map information for visually indicating the position of a swath. The processor 111 stores the generated swath map information in the storage 120.

The processor 211 of the user terminal device 200 downloads the swath map information from the server 100, and stores the swath map information in the storage 220. The processor 211 reads the swath map information from the storage 220, and causes the display device 250 to display the field map 260 indicating the position of the swath 40, according to the user's instruction through the input device 240. The position of the swath 40 is displayed on the field map 260, which allows the user to visually recognize the position of the swath 40.

As described above with reference to FIG. 12, when two swaths are joined together to form a single swath 40a, the position of the swath 40a is displayed on the field map 260. A swath obtained by joining two swaths together can be easily distinguished from a swath which is not a set of two swaths by giving different pieces of identification information thereto.

Figure 14:
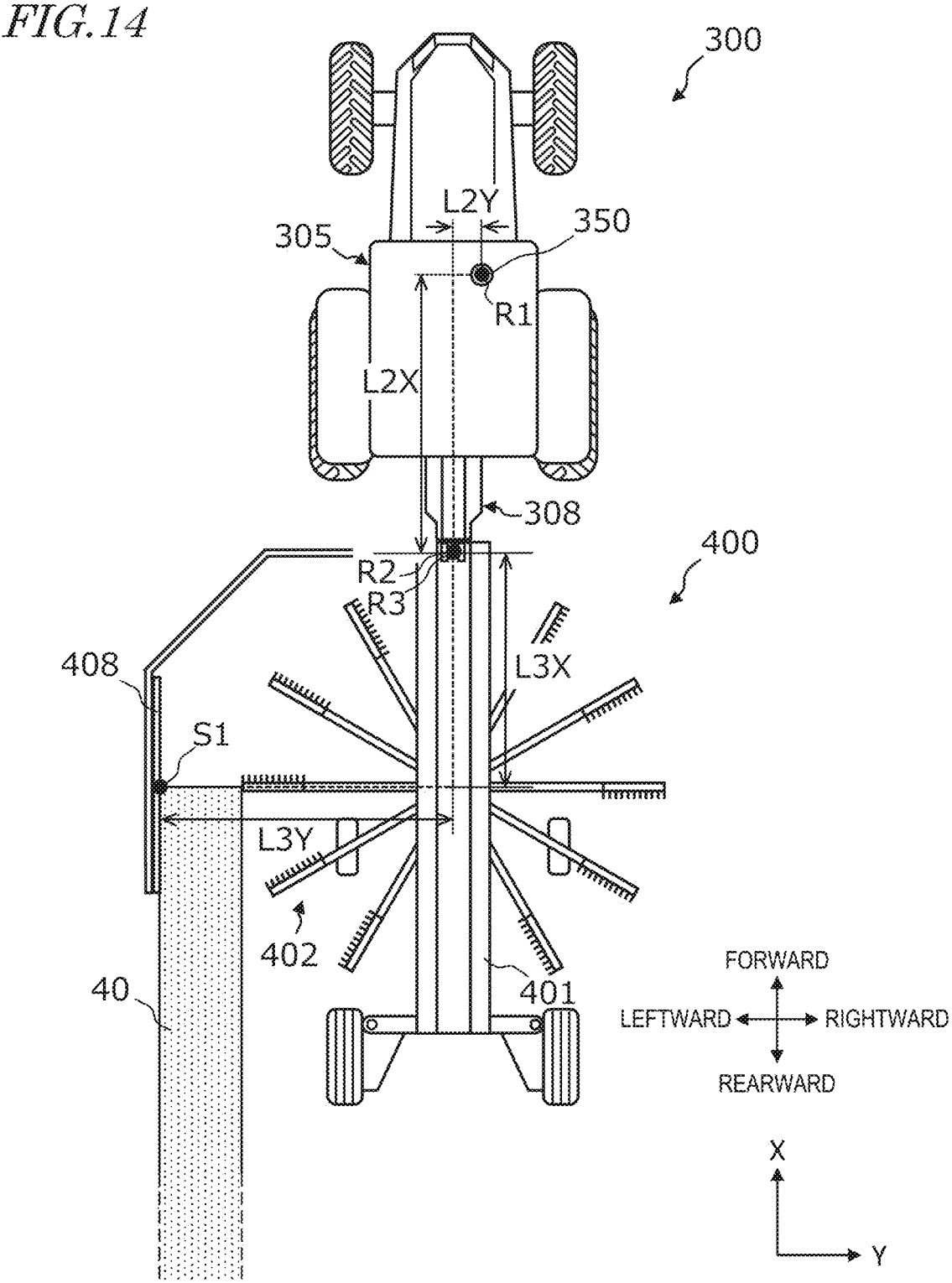
FIG. 14 is a diagram illustrating another method of obtaining a positional relationship between a reference point and a swath in a local coordinate system according to a preferred embodiment of the present invention.

Next, another method of obtaining the positional relationship between the reference point R1 and the swath 40 in the local coordinate system will be described. FIG. 14 is a diagram illustrating the positional relationship between the reference point R1 and the swath 40 in the local coordinate system.

In the example illustrated in FIG. 14, a reference position R2 in the tractor 300 is provided separately from the reference point R1. The reference position R2 is set at any position in the tractor 300. In this example, the reference position R2 is set at a position in the coupling device 308 where the rake implement 400 is connected to the coupling device 308. In the rake implement 400, a reference position R3 for the rake implement 400 is set. The reference position R3 is set at any position in the rake implement 400. In this example, the reference position R3 is set at a position in the frame 401 where the frame 401 is coupled to the coupling device 308.

In the local coordinate system that is defined for the tractor 300 and the rake implement 400 when the tractor 300 and the rake implement 400 are attached together, the reference positions R2 and R3 may be substantially the same. For example, the reference position R2 may be set at a position in the coupling device 308 where a hitch pin is inserted through the coupling device 308, and the reference position R3 is set at a position in the frame 401 where that hitch pin is inserted through the frame 401, the reference positions R2 and R3 are substantially the same. The hitch pin is inserted through both of the coupling device 308 and the frame 401 when the frame 401 is coupled to the coupling device 308. As used herein, it is assumed that the reference positions R2 and R3 are the same.

As illustrated in FIG. 14, the reference position R2 is located a length of L2Y to the left of the reference point R1 and a length of L2X behind the reference point R1. The position S1 of the swath 40 is located at a length of L3X behind the reference position R3 and a length of L3Y to the left of the reference position R3.

FIG. 15 is a diagram illustrating an example of the work vehicle information and the rake implement information. In the example illustrated in FIG. 15, the work vehicle information includes the model number of the tractor 300, and a tractor correction value that is information indicating a positional relationship between the reference point R1 and the reference position R2 in the local coordinate system. The rake implement information includes the model number of the rake implement 400, and an implement correction value that is information indicating a positional relationship between the reference position R3 and the position S1 of the swath 40 in the local coordinate system.

The rake implement 400 outputs the rake implement information to the tractor 300. The tractor 300 outputs the work vehicle information and the rake implement information to the server 100. The processor 111 of the server 100 can calculate the positional relationship (first positional relationship) between the reference point R1 and the position S1 of the swath 40 in the local coordinate system using the work vehicle information and the rake implement information.

The respective tractor correction values of a plurality of tractor models, and the respective implement correction values of a plurality of rake implement models, may be previously stored in the storage 120 of the server 100. The processor 111 of the server 100 may read the tractor correction value corresponding to the model number of the tractor 300, and the implement correction value corresponding to the model number of the rake implement 400, from the storage 120, and calculate the first positional relationship.

Figure 16:
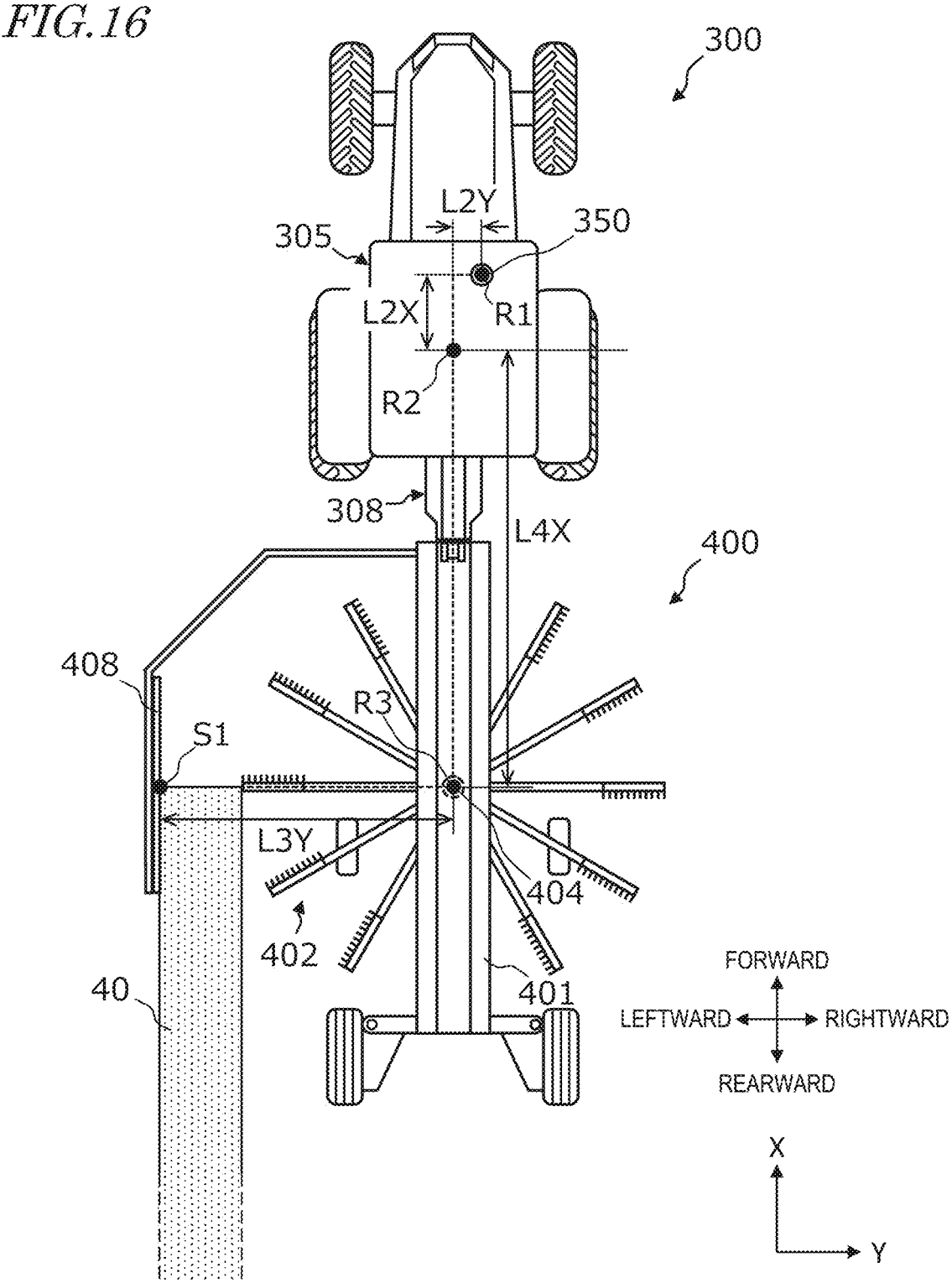
FIG. 16 is a diagram illustrating still another method of obtaining a positional relationship between a reference point and a swath in a local coordinate system according to a preferred embodiment of the present invention.

FIG. 16 is a diagram illustrating still another method of obtaining the positional relationship between the reference point R1 and the swath 40 in the local coordinate system. In the example illustrated in FIG. 16, the reference position R2 is set at the position of a center in the lateral direction of the tractor 300. The reference position R3 is set at the position of a center in the lateral direction of the frame 401 of the rake implement 400.

The reference position R2 in the local coordinate system may be previously specified for each tractor model. The reference position R3 in the local coordinate system may be previously specified for each rake implement model. When the tractor model and the rake implement model are known, the positional relationship between the reference positions R2 and R3 can be previously specified.

As illustrated in FIG. 16, the reference position R3 is located a length of L4X behind the reference position R2. The position S1 of the swath 40 is located a length of L3Y to the left of the reference position R3.

FIG. 17 is a diagram illustrating an example of an inter-reference position correction value that is information about the positional relationship between the reference positions R2 and R3 in the local coordinate system. The inter-reference position correction value is previously stored in the storage 120 of the server 100.

The processor 111 of the server 100 can calculate the positional relationship between the reference point R1 and the position S1 of the swath 40 in the local coordinate system using the work vehicle information, which includes the model number and tractor correction value of the tractor 300, the rake implement information, which includes the model number and implement correction value of the rake implement 400, and the inter-reference position correction value.

Figure 18:
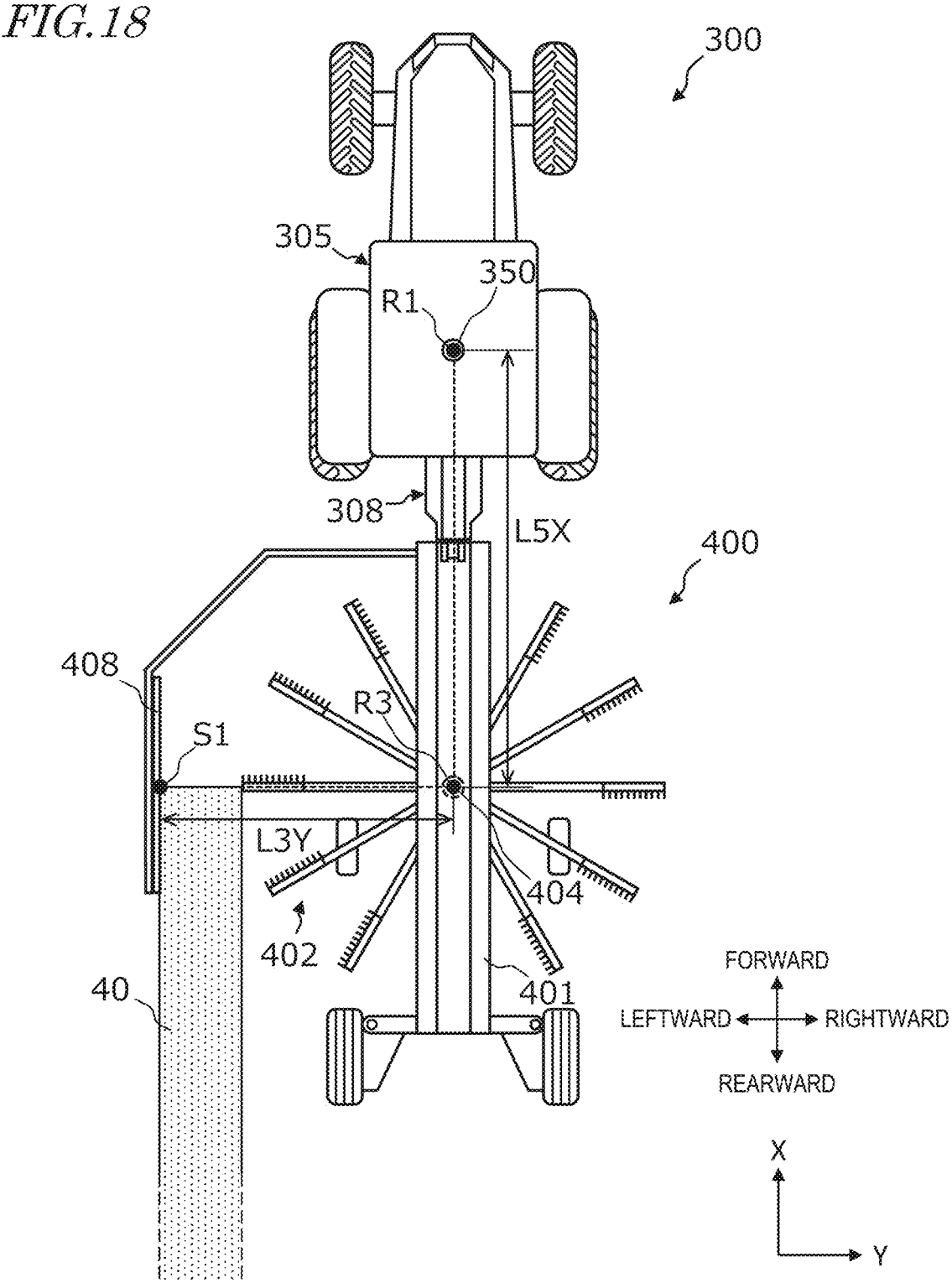
FIG. 18 is a diagram illustrating still another method of obtaining a positional relationship between a reference point and a swath in a local coordinate system according to a preferred embodiment of the present invention.

FIG. 18 is a diagram illustrating still another method of obtaining the positional relationship between the reference point R1 and the swath 40 in the local coordinate system. In the example illustrated in FIG. 18, the reference point R1 is set at the position of a center in the lateral direction of the tractor 300. The reference position R3 is set at the position of a center in the lateral direction of the frame 401 of the rake implement 400. When the tractor model and the rake implement model are known, a positional relationship between the reference point R1 and the reference position R3 can be previously specified. As illustrated in FIG. 18, the reference position R3 is located a length of L5X behind the reference point R1.

FIG. 19 is a diagram illustrating an example of a reference position correction value that is information about the positional relationship between the reference point R1 and the reference position R3 in the local coordinate system. The reference position correction value is previously stored in the storage 120 of the server 100.

The processor 111 of the server 100 can calculate the positional relationship between the reference point R1 and the position S1 of the swath 40 in the local coordinate system using the work vehicle information, which includes the model number of the tractor 300, the rake implement information, which includes the model number and implement correction value of the rake implement 400, and the reference position correction value.

As described above, the swath 40 is to be formed between the grass collector 402 and the screen 408 of the rake implement 400. In the above example, the position S1 of the swath 40 is set at a position on the screen 408 that is opposite the grass collector 402 (FIG. 14), or alternatively, may be set at other positions. For example, the position S1 may be set at a position on the grass collector 402 that is opposite the screen 408, or at the position of a center in the traverse direction (the Y direction in the local coordinate system) of the swath 40. The transverse direction of the swath 40 is perpendicular to the direction in which the swath 40 extends in the field.

A width of the swath 40 can be previously specified for each model of the rake implement 400. When the geographic coordinates of any position in the swath 40 in the transverse direction thereof are known, the geographic coordinates of other positions in the transverse direction can be calculated. FIG. 20 is a diagram illustrating an example of the geographic coordinates of an end and a center in the transverse direction of the swath 40. A first end of the swath corresponds to a position on the screen 408 that is opposite the grass collector 402. Position information about the first end of the swath is the same as the swath position information of FIG. 11. The positions of a center and a second end on the opposite side from the first end of the swath 40 can be calculated from the swath position information.

Next, a process of associating the position of the swath 40 with a position of grass collected to form the swath 40, will be described.

Figure 21:
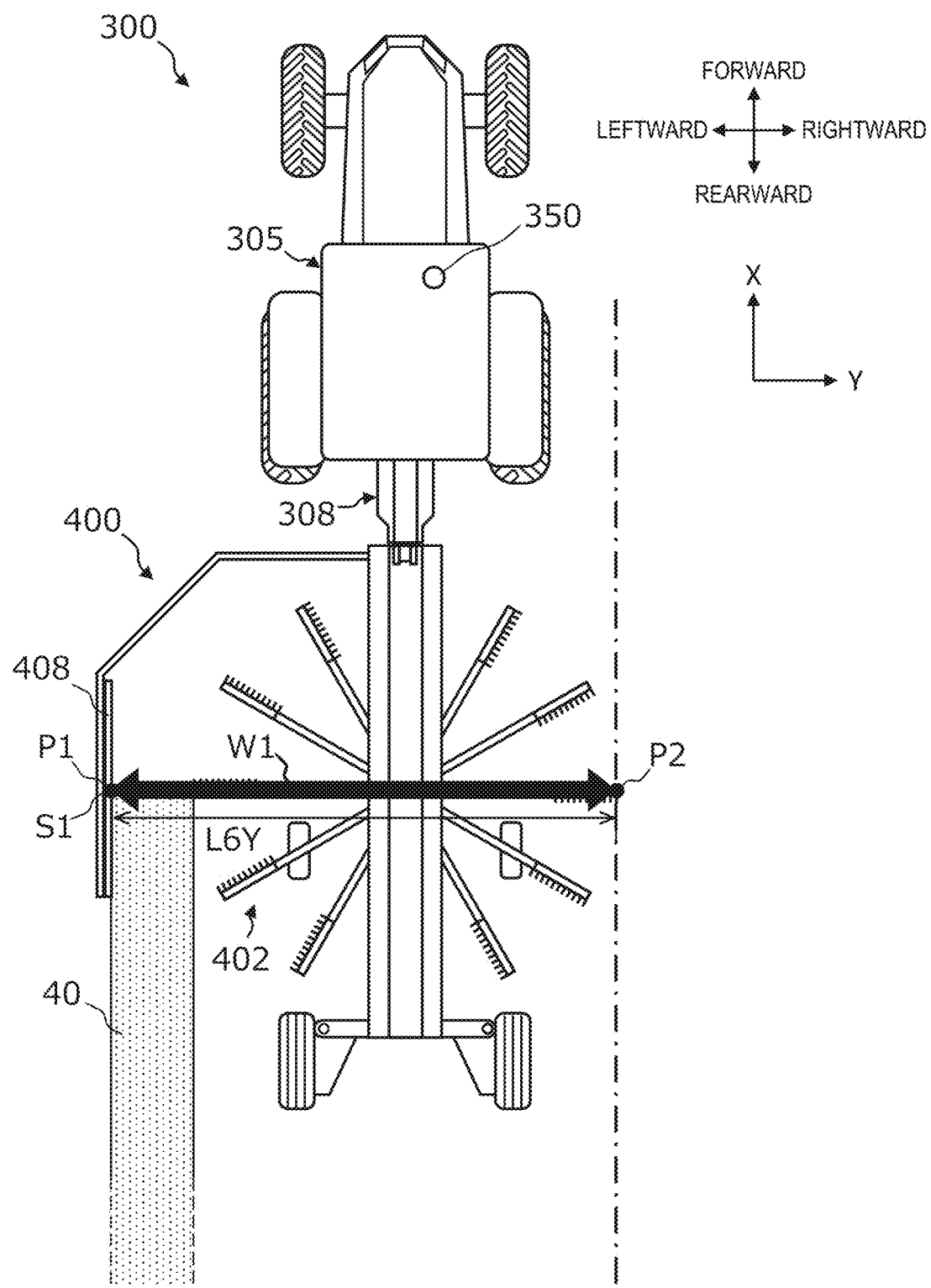
FIG. 21 is a diagram illustrating a range in which a rake implement collects grass according to a preferred embodiment of the present invention.

FIG. 21 is a diagram illustrating a range W1 in which the rake implement 400 collects grass. As described above, the grass collector 402 of the rake implement 400 is turned to collect grass. The screen 408 receives the grass collected by the grass collector 402, so that the swath 40 is formed between the grass collector 402 and the screen 408. The range W1 in which grass is collected is defined as the range between a position P1 on the screen 408 that is opposite the grass collector 402, and a position P2 of an end on the opposite side of the grass collector 402 from the screen 408, in the lateral direction (Y direction) of the rake implement 400.

In the case in which the position S1 set at a position on the screen 408 that is opposite the grass collector 402, the position P1 may be the same as the position S1.

FIG. 22 is a diagram illustrating the rake implement information including grass range information. The grass range information indicates a length in the Y direction of the range W1 in which grass is collected in the local coordinate system. The rake implement information is previously stored in the ROM 412 (FIG. 7) in the rake implement 400. As described above, the rake implement information is output to the server 100 through the tractor 300. The processor 111 of the server 100 calculates the positions P1 and P2 of grass in the geographic coordinate system using the swath position information and the grass range information. The processor 111 generates first swath information indicating a relationship between the position of the swath 40 and the position of grass collected to form the swath 40 in the geographic coordinate system.

FIG. 23 is a diagram illustrating an example of the first swath information. In the example illustrated in FIG. 23, it is assumed that the position P1 is the same as the position S1. The range W1 in which grass is collected in the geographic coordinate system is defined as the range between the geographic coordinates of the positions P1 and P2.

When the relationship between the position of the swath 40 and the position of grass collected to form the swath 40 is known, it is possible to determine the position in the field of the grass that is contained in the swath 40 at a specific position in the swath 40.

For each rake implement model, the grass range information may be previously stored in the storage 120 of the server 100. FIG. 24 is a diagram illustrating the grass range information for each rake implement model. The processor 111 may read the grass range information associated with the model number of a rake implement 400 attached to a tractor 300 from the storage 120, and generate the first swath information.

In the case in which two swaths 40*i* and 40*j* are joined together to form a single swath 40*a* (FIG. 12), the processor 111 combines the first swath information of the swath 40*i* with the first swath information of the swath 40*j* to generate the first swath information of the swath 40*a*. The first swath information of the swath 40*a* includes both information about the position of grass collected to form the swath 40*i* and information about the position of grass collected to form the swath 40*j*.

Next, a process of associating the position of the swath 40 with grass information about grass will be described.

The storage 120 of the server 100 previously stores the grass information (first grass information) for each predetermined area of the field. For example, the grass information indicates the species, moisture content, and growth state of grass in each predetermined area. The grass information may be obtained by observing grass in the field using an unmanned aerial vehicle, such as a drone, or by observing grass while driving a vehicle such as a tractor in the field. For example, grass may be observed during the above-mentioned work of cutting grass using a mower.

Figure 26:
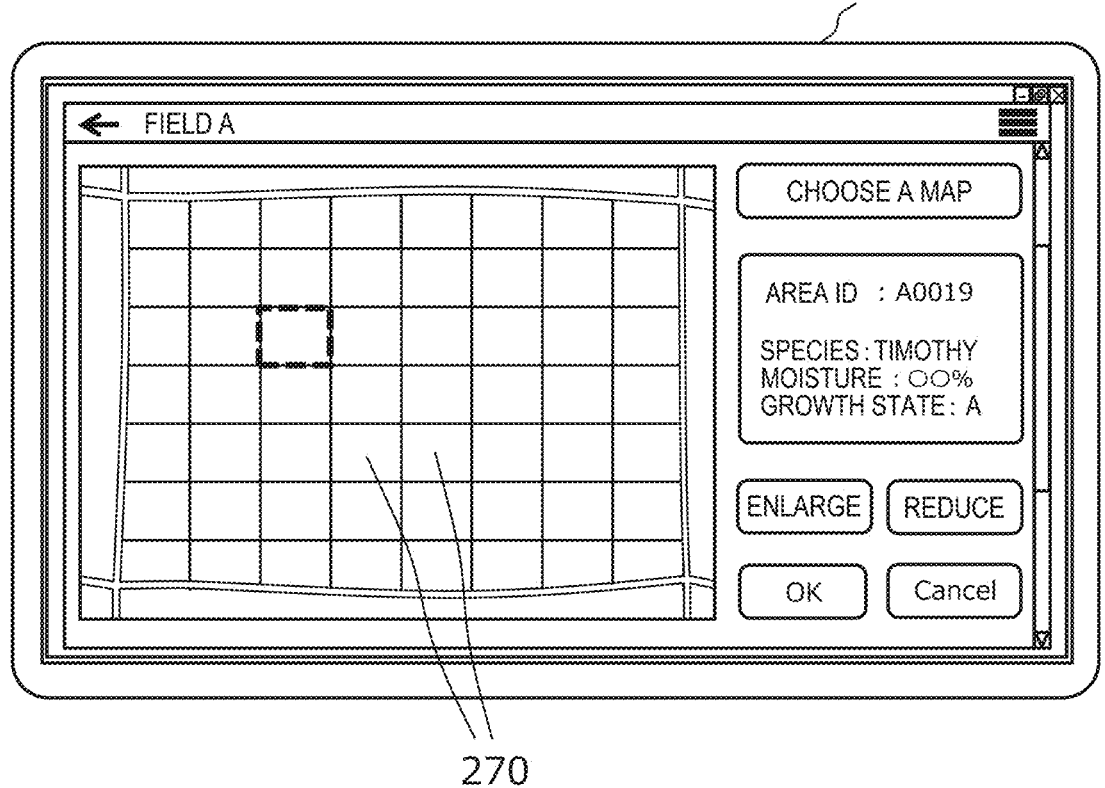
FIG. 26 is a diagram illustrating a display device displaying a map of a field and grass information according to a preferred embodiment of the present invention.

FIG. 25 is a diagram illustrating an example of the grass information. FIG. 26 is a diagram illustrating the display device 250 when the display device 250 displays a map of a field and the grass information. The field is divided into a plurality of areas 270. The grass information is assigned to each area 270. The grass information includes identification information of an area 270, information about the position of the area 270, and the species, moisture content, and growth state, etc., of grass. For example, in the case in which the area 270 has a rectangular shape, the position of the area may be represented by the geographic coordinates of the four vertices. The grass information is generated by assigning the above pieces of information obtained by observing grass as described above to each area 270. The grass information may include information about the date and time that the species, moisture content, and growth state of grass were observed.

The grass information is displayed together with the field map showing the plurality of areas 270 on the display device 250, which allows the user to check the state of grass in each area 270. When the user chooses one of the plurality of areas 270 displayed on the display device 250, the identification information of the chosen area 270, and the species, moisture content, growth state, etc., of grass in that area 270 are displayed on the display device 250.

As described above, the field map information includes information about geographic coordinates. The processor 111 extracts the grass information of an area 270 corresponding to the range W1 between the positions P1 and P2, which is indicated by the first swath information (FIG. 23). The processor 111 generates second swath information in which the position of the swath 40 is associated with the grass information, using the extracted grass information, and the swath position information indicated by the first swath information (FIG. 23).

In the case in which the range W1 covers two or more areas 270, the processor 111 extracts the grass information of the two or more areas 270. In that case, the processor 111 generates the second swath information including the grass information of the two or more areas 270.

FIG. 27 is a diagram illustrating an example of the second swath information. The second swath information indicates the species, moisture content, and growth state of grass at each position in the swath 40. The second swath information may include information about the date and time that the species, moisture content, growth state, etc., of grass were observed.

The association of the position of the swath 40 with the grass information allows obtaining of information about grass contained in the swath 40 at a specific position in the swath 40. For example, as described above, the species, moisture content, growth state, etc., of grass contained in the swath 40 can be known.

As illustrated in FIG. 13, the field map 260 displayed on the display device 250 indicates a plurality of swaths 40. When the user chooses one from the plurality of swaths 40, the identification information of the chosen swath 40, and the species, moisture content, growth state, etc., of grass in that swath 40, are displayed. As a result, the user can know the state of grass in each swath 40.

Next, a rake implement 400 including two or more grass collectors 402 will be described.

Figure 28:
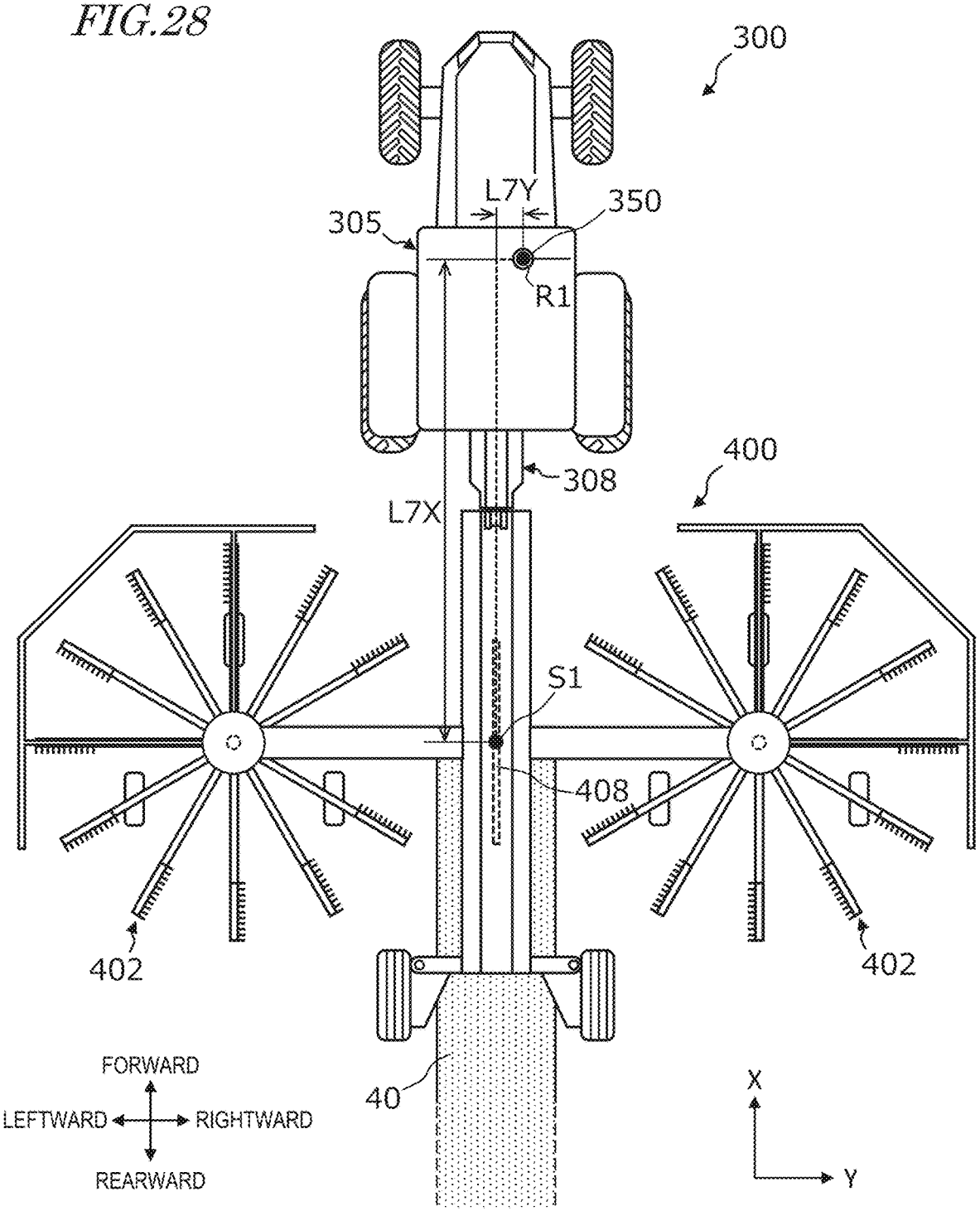
FIG. 28 is a diagram illustrating a positional relationship between a reference point and a position of a swath in a local coordinate system according to a preferred embodiment of the present invention.

The above method of obtaining the positional relationship between the reference point R1 and the position S1 of the swath 40 in the local coordinate system is applicable to a rake implement 400 including two or more grass collectors 402. FIG. 28 is a diagram illustrating the positional relationship between the reference point R1 and the position S1 of the swath 40 in the local coordinate system. In the example illustrated in FIG. 28, the rake implement 400 includes two grass collectors 402.

In the rake implement 400 of FIG. 28, the swath 40 is formed between the two grass collectors 402. A single swath 40 is formed from grass collected by the two grass collectors 402. For example, the position of a center in the transverse direction (the Y direction in the local coordinate system) of the swath 40 may be substantially the same as the position of a center in the lateral direction of the rake implement 400. A screen 408 is located at the position of a center in the lateral direction of the rake implement 400. The position S1 of the swath 40 is set at a position coinciding with the screen 408 as viewed from above.

As illustrated in FIG. 28, the position S1 of the swath 40 is located a length of L7Y to the left of the reference point R1 and a length of L7X behind the reference point R1. When the values of L7X and L7Y are known, the position of the swath 40 in the geographic coordinate system can be calculated from the position information of the reference point R1 detected by the position detector 350.

FIG. 29 is a diagram illustrating an example of first positional relationship information indicating a positional relationship (first positional relationship) between the reference point R1 and the position S1 of the swath 40 in the local coordinate system. The first positional relationship information of FIG. 29 indicates the positional relationship for each of combinations of a plurality of tractor models and a plurality of rake implement models.

As described above, the processor 111 of the server 100 can calculate the position S1 of the swath 40 in the geographic coordinate system, using the reference point position information, the azimuth information, and the first positional relationship information, to generate swath position information indicating the position of the swath 40 in the geographic coordinate system.

The positional relationship between the reference point R1 and the position S1 of the swath 40 may be obtained by a method different from that described above with reference to FIGS. 28 and 29. For example, the positional relationship between the reference point R1 and the position S1 of the swath 40 may be obtained by methods similar to those described above with reference to FIGS. 14 to 19.

Figure 30:
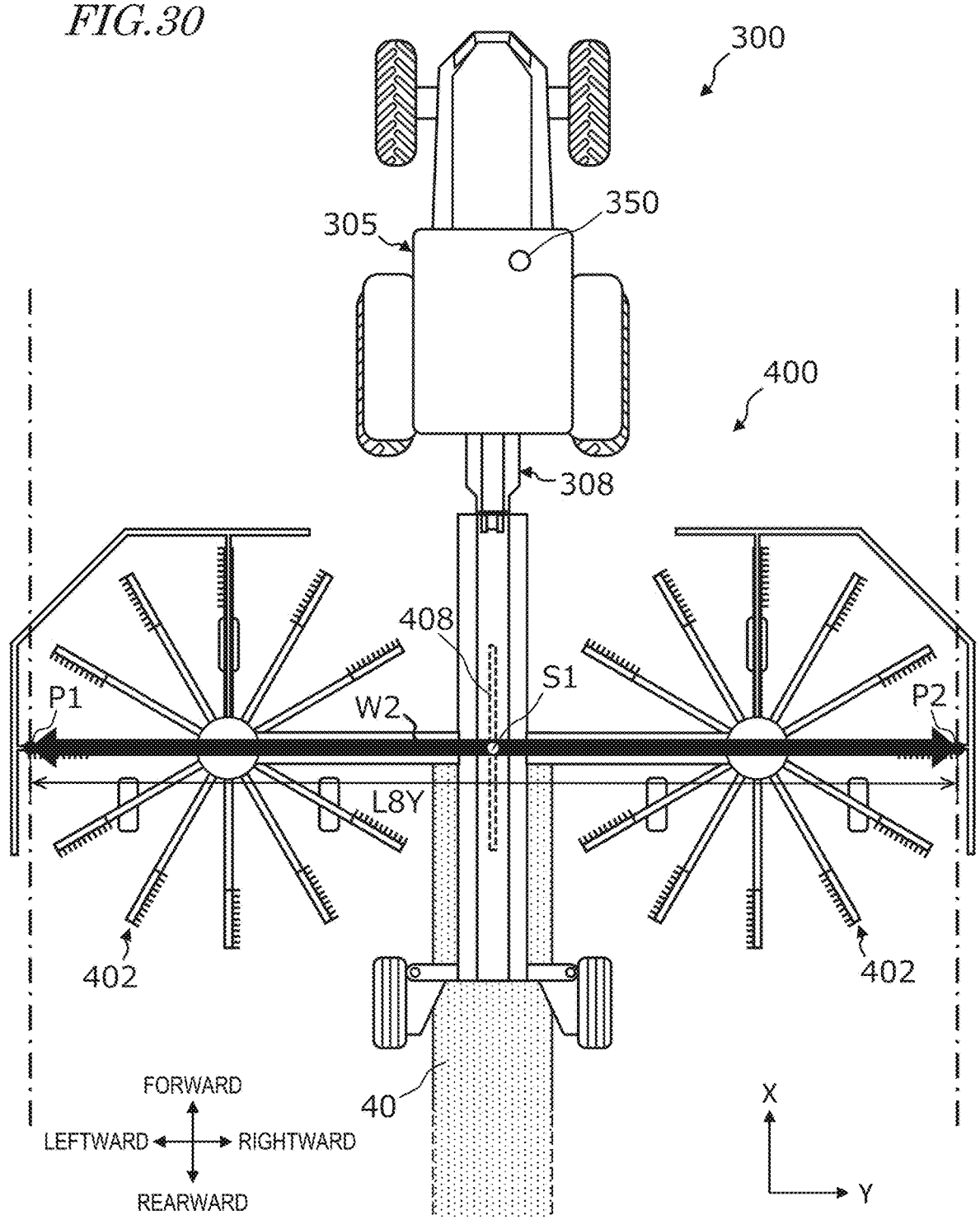
FIG. 30 is a diagram illustrating a range in which a rake implement including two grass collectors collects grass according to a preferred embodiment of the present invention.

FIG. 30 is a diagram illustrating a range W2 in which the rake implement 400 including the two grass collectors 402 collects grass. The range W2 in which grass is collected is defined as the range between a position P1 of a left end of one of the grass collectors 402 and a position P2 of a right end of the other grass collector 402 in the lateral direction (Y direction) of the rake implement 400.

FIG. 31 is a diagram illustrating the rake implement information including grass range information. The grass range information indicates a length in the Y direction of the range W2 in which grass is collected in the local coordinate system. As described above, the processor 111 of the server 100 calculates the positions P1 and P2 of grass in the geographic coordinate system using the swath position information and the grass range information. The processor 111 can generate first swath information indicating a relationship between the position of the swath 40 and the position of grass collected to form the swath 40 in the geographic coordinate system. The processor 111 also generates second swath information in which the position of the swath 40 is associated with the grass information using the grass information and the first swath information.

Although it is assumed above that the processes described with reference to FIGS. 8 to 31 are mainly executed by the processing device 110 (FIG. 6) of the server 100, these processes may be executed by a processor included in an apparatus other than the server 100. For example, the processes may be executed by the processing device 210 of the user terminal device 200 or the processing device 310 of the tractor 300.

In the above preferred embodiments, the position information indicating the position S1 of the swath 40 is obtained using the position information of the reference point R1 detected by the position detector 350 provided in the tractor 300. Alternatively, in the case in which a position detector is provided in the rake implement 400, the position information indicating the position S1 of the swath 40 may be obtained using the position detector provided in the rake implement 400. In that case, by setting the reference point and/or the reference position in the rake implement 400, the position information indicating the position S1 of the swath 40 can be obtained in a manner similar to that described above.

Next, setting of a travel path for the tractor 300 and the baler 500 (FIG. 4) will be described. As described above, after the rake implement 400 forms the swath 40, the baler 500 collects grass contained in the swath 40, and forms the bale 50. In the work of forming the bale 50, the tractor 300 may be moved by automatic traveling or automatic steering while drawing the baler 500.

In the farming support system 10, the swath position information indicating the position in the geographic coordinate system of the swath 40 formed in the field, can be obtained using the above method. When the geographic coordinates of the swath 40 in the field are known, the travel path of the tractor 300 and the baler 500 for forming the bale 50 can be easily set.

Figure 32:
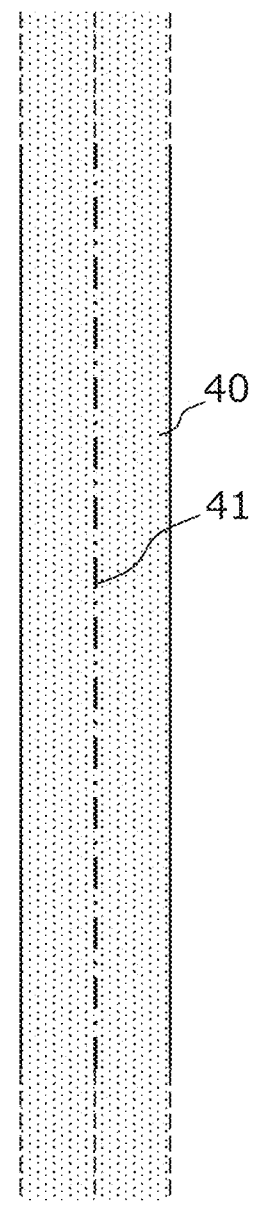
FIG. 32 is a diagram illustrating an example of a travel path for a tractor and a baler according to a preferred embodiment of the present invention.

FIG. 32 is a diagram illustrating an example of the travel path for the tractor 300 and the baler 500. In the example illustrated in FIG. 32, the travel path 41 for the tractor 300 and the baler 500 passes through a center in the transverse direction of the swath 40. The transverse direction of the swath 40 is perpendicular to the direction in which the swath 40 extends in the field.

As described above with reference to FIG. 20, when the geographic coordinates of any position in the swath 40 in the transverse direction thereof are known, the geographic coordinates of other positions in the transverse direction can be calculated. The processor 111 of the server 100 calculates the geographic coordinates of a center in the transverse direction of the swath 40 using the swath position information. The processor 111 sets a line passing through the calculated geographic coordinates of a plurality of centers as the travel path 41. For example, the processor 111 sets a line passing through the geographic coordinates of centers of the swath 40 of FIG. 20 as the travel path 41. As a result, the travel path 41 that passes through substantially the center in the transverse direction of the swath 40 is set.

In the case in which two swaths 40i and 40j are joined together to form a single swath 40a (FIG. 12), the processor 111 may use the swath position information of one of the swaths 40i and 40j. As can be seen from FIG. 12, the position through which the screen 408 of the rake implement 400 passes is substantially the same as the position of the center in the transverse direction of the swath 40a. In other words, in the case in which the position S1 of the swath 40 is set at a position on the screen 408 that is opposite the grass collector 402, the position S1 is substantially the same as the position of the center in the transverse direction of the swath

40a. In that case, the geographic coordinates of the position S1 can be used as the geographic coordinates of the center in the transverse direction of the swath 40a.

Although the swath 40 illustrated in FIG. 32 has a straight linear shape, at least a portion of the swath 40 may have a curved shape. For the portion having a curved shape, the geographic coordinates of the center of the swath 40 may be calculated for each set of geographic coordinates indicated by the swath position information, and a travel path that passes through the geographic coordinates of these centers may be set, whereby the tractor 300 and the baler 500 can be caused to travel, following the curved shape of the swath 40.

The processor 111 generates and outputs travel path information indicating the geographic coordinates of the set travel path 41 to the tractor 300. The processor 311 (FIG. 6) of the tractor 300 stores the received travel path information in the storage 320 or the ROM 312.

Next, a process of specifying a position in the geographic coordinate system of grass that is picked up by the baler 500 will be described. In order to identify the position in the field of grass in the swath 40 that is contained in the bale 50 formed by the baler 500, position information indicating the position in the geographic coordinate system of grass that is picked up by the baler 500 is generated. By associating the position information with the bale 50, the position in the field of grass in the swath 40 that is contained in the bale 50 can be identified.

As described above with reference to FIG. 4, the baler 500 picks up grass from the pick-up part 510. The position (reference point R1) detected by the position detector 350 provided in the tractor 300 is different from the position where grass is picked up by the baler 500. Therefore, in this preferred embodiment, the position information output by the position detector 350 is corrected so as to specify a position where grass is picked up.

A plurality of types of balers are attachable to the tractor 300. The plurality of types of balers have different body sizes and different positions where grass is picked up. Therefore, the way to correct the position information may be changed, depending on the baler model.

Figure 33:
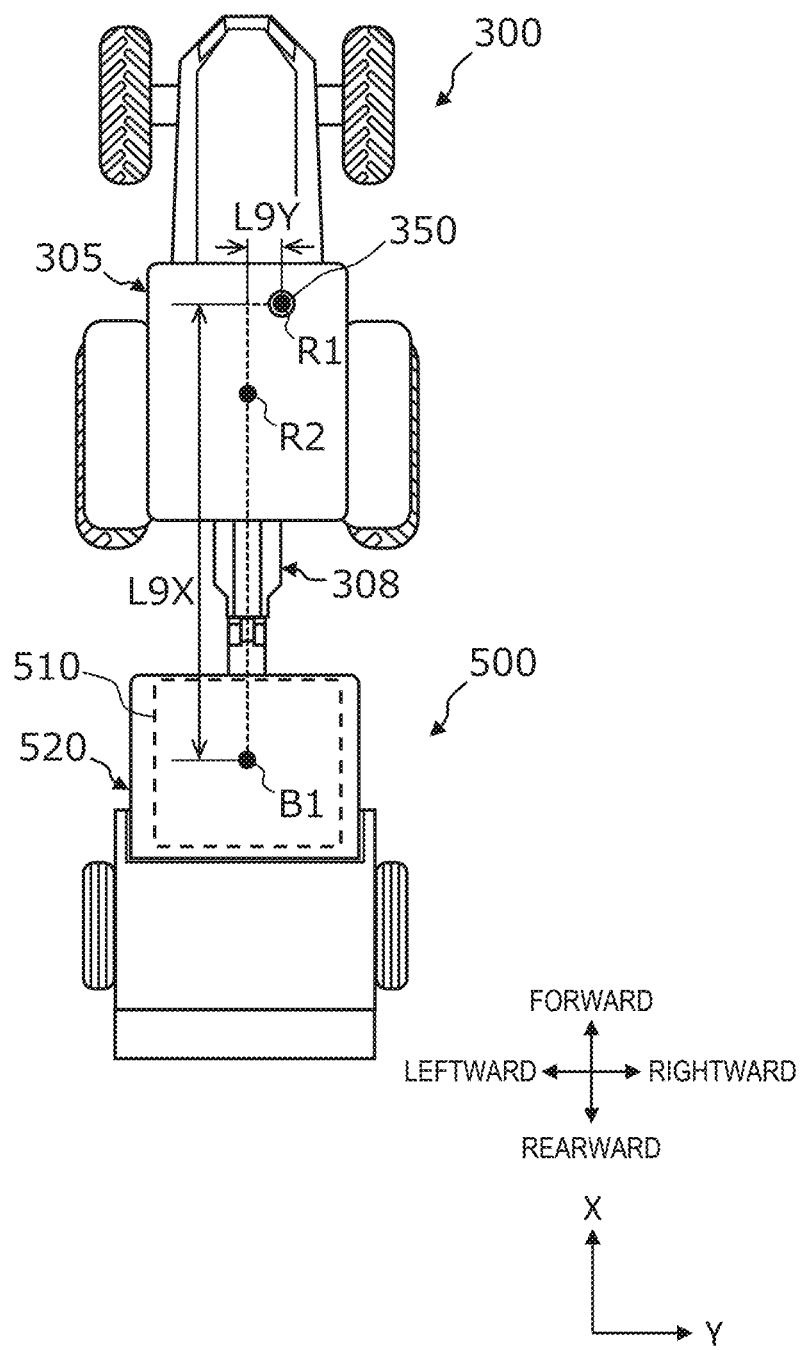
FIG. 33 is a diagram illustrating a positional relationship between a reference point and a position where a baler picks up grass in a local coordinate system according to a preferred embodiment of the present invention.

FIG. 33 is a diagram illustrating a positional relationship between the reference point R1 and a position (reference position B1) where the baler 500 picks up grass in the local coordinate system. The pick-up part 510 of the baler 500 picks up grass in a predetermined range in the lateral direction. The reference position B1 is set at a center of the predetermined range in the lateral direction. The reference position B1 may be the same as the position of the center in the lateral direction of the baler 500.

As illustrated in FIG. 33, the reference position B1 is located a length of L9Y to the left of the reference point R1 and a length of L9X behind the reference point R1. When the values of L9X and L9Y are known, the geographic coordinates of the reference position B1 can be calculated from the position information of the reference point R1 detected by the position detector 350.

The processor 111 of the server 100 initially obtains the work vehicle information about the tractor 300, and baler information about the baler 500 attached to the tractor 300. The baler information includes, for example, specific information that can be used to identify the model of the baler 500. The specific information includes, for example, the model number of the baler 500.

The baler information is previously stored in a storage (e.g., the ROM 412 (FIG. 7)) in the baler 500. As described above, the tractor 300 and the baler 500 are capable of communication compliant with a communication control standard, such as ISOBUS.

When the baler 500 is attached to the tractor 300, the processor 411 of the baler 500 reads the baler information from the ROM 412, and outputs the baler information to the communication interface 430. The baler information is transmitted from the communication interface 430 to the communication interface 390 of the tractor 300. The communication interface 390 receives and outputs the baler information to the processor 311. The processor 311 outputs the received baler information to the server 100 through the communication interface 330.

Based on the work vehicle information and the baler information, the processor 111 obtains information indicating a positional relationship between the reference point R1 and the reference position B1 of the baler 500 in the local coordinate system that is defined for the tractor 300 and the baler 500 when the tractor 300 and the baler 500 are attached together.

FIG. 34 is a diagram illustrating an example of second positional relationship information indicating the positional relationship (second positional relationship) between the reference point R1 and the reference position B1 in the local coordinate system. The second positional relationship information is previously stored in the storage 120 of the server 100. When the model of the tractor and the model of the baler are known, the values of L9X and L9Y can be previously specified. For each of combinations of a plurality of tractor models and a plurality of baler models, the values of L9X and L9Y can be previously specified. The values of L9X and L9Y may be obtained by actual measurement, or may be calculated based on the design values. The model of each tractor and the model of each baler may, for example, be represented by a model number. The second positional relationship information of FIG. 34 indicates the positional relationship for each of combinations of a plurality of tractor models and a plurality of baler models. Because the positional relationship is based on the reference point R1, the values of L9X and L9Y are negative.

During the work of forming the bale 50 using the baler 500, the position detector 350 detects the position of the reference point R1 in the geographic coordinate system, while the IMU 360 (FIG. 6) detects the azimuth of the travel direction of the tractor 300. The processor 311 of the tractor 300 generates the reference point position information indicating the position of the reference point R1 and the azimuth information indicating the azimuth of the travel direction using output signals of the position detector 350 and the IMU 360.

The processor 311 calculates the geographic coordinates of the reference position B1 using the reference point position information, the azimuth information, and the second positional relationship information (FIG. 34).

The processor 311 and/or the ECU 370 (FIG. 6) of the tractor 300 control an operation of the drive device 380 of the tractor 300 such that the reference position B1 of the baler 500 passes through the position of the geographic coordinates indicated by the travel path information.

When the tractor 300 and the baler 500 are attached together and travel straight, the position (reference position R2) of the center in the lateral direction of the tractor 300 is substantially the same as the reference position B1 as illustrated in FIG. 33. Therefore, by controlling the operation of the drive device 380 such that the reference position R2 in the tractor 300 passes through the position of the geographic coordinates indicated by the travel path information, the reference position B1 of the baler 500 can be caused to pass through the position of the geographic coordinates indicated by the travel path information.

When the swath 40 has a curved shape and the tractor 300 follows the curved swath 40, the positional relationship between the reference position R2 and the reference position B1 that is taken when the tractor 300 is curving is calculated, and the tractor 300 can be caused to travel such that the reference position B1 passes through the position of the travel path 41. For example, information indicating the steering angle of the tractor 300 and the relationship between the reference positions R2 and B1 may be previously stored in the storage 120 of the server 100. The processor 311 of the tractor 300 may receive that information from the server 100, and obtain the positional relationship between the reference positions R2 and B1 which corresponds to the steering angle.

The steering control and speed control of the tractor 300 may be implemented by a control technique such as a proportional-integral-derivative (PID) controller or model predictive control (MPC). By using these control techniques, the tractor 300 can be smoothly controlled to follow the travel path 41.

The baler 500 can be caused to travel along the travel path 41 passing through the center in the transverse direction of the swath 40, so that an appropriate positional relationship between the baler 500 and the swath 40 can be maintained, and therefore, the bale 50 can be efficiently formed.

The positional relationship between the reference point R1 and the reference position B1 in the local coordinate system may be obtained by a method different from that described above with reference to FIGS. 33 and 34. For example, the positional relationship between the reference point R1 and the reference position B1 may be obtained by methods similar to those described above with reference to FIGS. 14 to 19.

Next, a process of associating the position of the bale 50 with the position of grass will be described. If the position in the field from which the grass contained in the bale 50 was picked up is known, traceability can be achieved. In addition, by checking the growth state of the grass contained in the bale 50, the user can determine a relationship between the position in the field and the growth state of the grass.

In the work of forming the bale 50, the tractor 300 travels along the set travel path 41 while drawing the baler 500. The operation of the baler 500 to form the bale 50 may be controlled by the processor 411 (FIG. 6) of the baler 500 and/or an ECU included in the baler 500. The processor 411 transmits a start signal indicating the start of formation of the bale 50 to the tractor 300 through the communication interface 430 with the timing of start of formation of the bale 50. The processor 411 also transmits an end signal indicating the end of formation of the bale 50 through the communication interface 430 with the timing of end of formation of the bale 50.

The processor 311 of the tractor 300 generates formation start time information indicating the time that the start signal was received, and stores the formation start time information in the storage 320 or the ROM 312. The processor 311 also generates formation end time information indicating the time that the end signal was received, and stores the formation end time information in the storage 320 or the ROM 312. The processor 311 outputs the formation start time information and the formation end time information to the server 100 through the communication interface 330.

In the work of forming the bale 50, the position detector 350 detects the position of the reference point R1 in the geographic coordinate system, while the IMU 360 detects the azimuth of the travel direction of the tractor 300. The processor 311 generates the reference point position information indicating the position of the reference point R1 and the azimuth information indicating the azimuth of the travel direction using output signals of the position detector 350 and the IMU 360. The processor 311 outputs, to the server 100, the reference point position information and the azimuth information together with time information indicating the time that the position and the azimuth of the travel direction of the reference point R1 were detected.

The processor 111 of the server 100 obtains the geographic coordinates of the reference point R1 that were taken at the time indicated by the formation start time information, using the reference point position information. For example, the processor 111 calculates the geographic coordinates of the reference point R1 that were taken at the time indicated by the formation start time information, based on a plurality of geographic coordinates indicated by the reference point position information and the times that the plurality of geographic coordinates were detected. The processor 111 calculates the geographic coordinates of the reference position B1 using the calculated geographic coordinates of the reference point R1, the azimuth information, and the second positional relationship information (FIG. 34). The geographic coordinates of the reference position B1 correspond to the geographic coordinates of the position where the baler 500 started formation of the bale 50.

Likewise, the processor 111 obtains the geographic coordinates of the reference point R1 that were taken at the time indicated by the formation end time information, using the reference point position information. The processor 111 calculates the geographic coordinates of the reference position B1 using the geographic coordinates of the reference point R1, the azimuth information, and the second positional relationship information. The geographic coordinates of the reference position B1 correspond to the geographic coordinates of the position where the baler 500 ended the formation of the bale 50.

The processor 111 generates bale position information indicating the geographic coordinates of the start position of the formation of the bale 50 and the geographic coordinates of the end position of the formation of the bale 50.

FIG. 35 is a diagram illustrating identification information of the bale 50, time information indicating the start time and end time of formation of the bale 50, and the bale position information. A bale 50 is formed by the baler 500 performing a series of operations from the start to end of formation of the bale 50. As described above, the formed bale 50 is discharged out of the baler 500 through the discharge opening 506 (FIG. 4). After discharging the bale 50, the baler 500 starts forming another bale 50. The processor 111 provides identification information to each bale 50. By associating the identification information of the bale 50 with the bale position information of the bale 50, it is possible to identify the position in the field where each bale 50 was formed.

As described above, in the case in which the travel path has undulations and slopes, the attitudes of the tractor 300 and the baler 500 may be tilted, so that a deviation may occur in geographic coordinates detected by the position detector 350. The processor 111 may correct the geographic coordinates according to the magnitude of the tilt of the tractor 300 obtained from an output signal of the IMU 360.

Next, the processor 111 performs a process of associating the bale 50 with the position of grass.

When the position where the bale 50 was formed is known, the bale 50 can be associated with the position of grass using the above first swath information (FIG. 23). The first swath information indicates the relationship between the position of the swath 40 and the position of grass collected to form the swath 40 in the geographic coordinate system.

For example, the processor 111 extracts, from the first swath information, the geographic coordinates of the swath 40 that are closest to the geographic coordinates of the formation start position of the bale 50, and associates those geographic coordinates of the swath 40 with the formation start position of the bale 50. Likewise, the processor 111 extracts, from the first swath information, the geographic coordinates of the swath 40 that are closest to the geographic coordinates of the formation end position of the bale 50, and associates those geographic coordinates of the swath 40 with the formation end position of the bale 50.

The processor 111 extracts, from the first swath information, the geographic coordinates of the swath 40 located between the geographic coordinates of the swath 40 associated with the formation start position and the geographic coordinates of the swath 40 associated with the formation end position. The processor 111 extracts, from the first swath information, the geographic coordinates of the positions of grass associated with the extracted geographic coordinates of the swath 40. The processor 111 generates grass position information including the extracted geographic coordinates of the swath 40 and the extracted geographic coordinates of the positions of grass. The grass position information indicates the positions of the grass associated with the swath 40 located between the formation start position and formation end position of the bale 50.

The processor 111 generates first bale information in which the grass position information is associated with the identification information of the bale 50 having the formation start position and formation end position.

FIG. 36 is a diagram illustrating an example of the first bale information. The grass position information includes the geographic coordinates of a first end of grass and the geographic coordinates of a second end of the grass. The first end of grass indicates one end of the range in which grass was collected to form the swath 40, and the second end indicates the other end. The first bale information may include information about the date and time that the swath 40 used to form the bale 50 was formed. In the example illustrated in FIG. 36, the geographic coordinates of the first and second ends of the range in which grass was collected to form the swath 40a (FIG. 12) are indicated. As described above, in the case in which two swaths 40i and 40j are joined together to form a swath 40a, the first swath information of the swath 40i and the first swath information of the swath 40j can be combined together to generate the first swath information of the swath 40a. The first swath information of the swath 40a includes both information about the position of grass collected to form the swath 40i and information about the position of grass collected to form the swath 40j.

The association of the identification information of the bale 50 with the position of grass used to form the bale 50 allows the user to know the position in the field from which the grass contained in the bale 50 was picked up, and therefore, traceability can be achieved. In addition, by checking the state of the grass contained in the bale 50, the user can determine a relationship between the position in the field and the growth state of the grass.

Next, a process of associating the bale 50 with the grass information will be described. As described above, the grass information includes information about the species, moisture content, growth state, etc., of grass. The association of the bale 50 with the grass information allows the user to know details of the grass contained in the bale 50.

When the position where the bale 50 was formed is known, the bale 50 can be associated with the grass information using the above second swath information (FIG. 27). The second swath information indicates the relationship between the position of the swath 40 in the geographic coordinate system and the grass information.

The geographic coordinates of the formation start position of bale 50 and the geographic coordinates of the formation end position of bale 50 can be obtained using the above method.

For example, the processor 111 extracts, from the second swath information, the geographic coordinates of the swath 40 that are closest to the geographic coordinates of the formation start position of the bale 50, and associates those geographic coordinates of the swath 40 with the formation start position of the bale 50. Likewise, the processor 111 extracts, from the second swath information, the geographic coordinates of the swath 40 that are closest to the geographic coordinates of the formation end position of the bale 50, and associates those geographic coordinates of the swath 40 with the formation end position of the bale 50.

The processor 111 extracts, from the second swath information, the geographic coordinates of the swath 40 located between the geographic coordinates of the swath 40 associated with the formation start position and the geographic coordinates of the swath 40 associated with the formation end position. The processor 111 extracts, from the second swath information, details of grass associated with the extracted geographic coordinates of the swath 40. The processor 111 generates grass information (second grass information) including the extracted geographic coordinates of the swath 40 and the extracted details of grass. The grass information indicates information about the grass associated with the swath 40 located between the formation start position and formation end position of the bale 50.

The processor 111 generates second bale information in which the identification information of bales 50 having respective pairs of a formation start position and a formation end position with the generated grass information.

FIG. 37 is a diagram illustrating an example of the second bale information. The second bale information includes the identification information of each bale 50, the position of the swath 40 used to form the bale 50, and details of grass associated with the position of the swath 40. The details of grass associated with the position of the swath 40 correspond to the details of grass contained in the bale 50. The second bale information may include information about the date and time that the species, moisture content, growth state, etc., of grass were observed. The second bale information may also include information about the date and time that the swath 40 used to form the bale 50 was formed.

The association of the identification information of the bale 50 with information about grass used to form the bale 50 allows the user to know what kind of grass is contained in the bale 50. For example, the user is allowed to know the species, moisture content, growth state, etc., of grass contained in the bale 50.

The process of obtaining the formation start position and formation end position of the bale 50 in the geographic coordinate system, the process of associating the bale 50 with the position of grass, and the process of associating the bale 50 with the grass information, may be performed either during the work of forming the bale 50 or after completion of the work of forming the bale 50. In the case in which these processes are performed after completion of the work of forming the bale 50, the processor 311 (FIG. 6) of the tractor 300 stores various kinds of information such as the formation start time information, the formation end time information, the reference point position information, the azimuth information, and the time information in the storage 320. After completion of the work of forming the bale 50, the processor 311 reads these kinds of information from the storage 320, and outputs the information to the server 100. The processor 111 of the server 100 may perform the above processes using the received information.

Although in the foregoing, it is assumed that the processes described above with reference to FIGS. 32 to 37 are mainly executed by the processing device 110 (FIG. 6) of the server 100, those processes may be executed by a processor included in an apparatus other than the server 100. For example, those processes may be executed by the processing device 210 of the user terminal device 200 or the processing device 310 of the tractor 300.

In the above preferred embodiments, the position information of the reference position B1 of the baler 500 is obtained using the position information of the reference point R1 detected by the position detector 350 provided in the tractor 300. Alternatively, in the case in which a position detector is provided in the baler 500, the position information of the reference position B1 may be obtained using the position detector provided in the baler 500. In that case, by setting the reference point and/or the reference position in the baler 500, the position information of the reference position B1 may be obtained in a manner similar to that described above.

A tractor 300 to which a rake implement 400 is attached, and a tractor 300 to which a baler 500 is attached, may be the same or different. In the case in which the same tractor 300 is used, the position detector 350 provided in the tractor 300 can be used both for the work of forming the swath 40 and the work of forming the bale 50.

Thus, preferred embodiments of the present disclosure provide farming support systems, position information generation methods, computer programs, and processors described in the following items.

Item 1

A farming support system including a first position detector provided in one of a work vehicle and a rake implement attachable to the work vehicle, and a processor configured or programmed to obtain, based on rake implement information about the rake implement, a first positional relationship between a reference point to be positioned by the first position detector and a swath to be formed by the rake implement, in a local coordinate system that is defined for the work vehicle and the rake implement which is attached to the work vehicle, wherein the processor is configured or programmed to generate swath position information indicating a position of the swath in a geographic coordinate system, based on information indicating a position of the reference point in the geographic coordinate system detected by the first position detector during a work of forming the swath, and the first positional relationship.

Item 2

In the farming support system according to item 1, the processor is configured or programmed to generate swath map information in which the swath position information is associated with map information of a field, and a map of the field indicating the position of the swath is displayed on a display device, based on the swath map information.

Item 3

In the farming support system according to item 1 or 2, the rake implement information includes information indicating a relationship between a reference position of the rake implement in a local coordinate system of the rake implement and the position of the swath to be formed by the rake implement, the processor is configured or programmed to obtain first information indicating a relationship between the reference position of the rake implement and the position of the reference point, and the processor is configured or programmed to determine the first positional relationship, based on the rake implement information and the first information.

Item 4

In the farming support system according to item 1 or 2, the first position detector is provided in the work vehicle, the rake implement information includes information indicating a relationship between a reference position of the rake implement in a local coordinate system of the rake implement, and the position of the swath to be formed by the rake implement, the processor is configured or programmed to obtain second information indicating a relationship between the reference point and a reference position of the work vehicle, and third information indicating a relationship between the reference position of the work vehicle and the reference position of the rake implement, and the processor is configured or programmed to determine the first positional relationship, based on the rake implement information, the second information, and the third information.

Item 5

In the farming support system according to any one of items 1 to 4, the rake implement information is stored in the rake implement, and is transmitted from the rake implement to the work vehicle when the rake implement is attached to the work vehicle, and the processor is configured or programmed to obtain the rake implement information from the work vehicle.

Item 6

The farming support system according to any one of items 1 to 4, further including a storage to store rake implement information about a plurality of models of the rake implements, wherein model information indicating the model of the rake implement is transmitted from the rake implement to the work vehicle when the rake implement is attached to the work vehicle, the processor is configured or programmed to obtain the model information from the work vehicle, and the processor is configured or programmed to obtain, from the storage, the rake implement information corresponding to the model indicated by the model information.

Item 7

In the farming support system according to any one of items 1 to 6, the rake implement information includes information indicating a relationship between the position of the swath to be formed by the rake implement and a range in which the rake implement collects grass, in a local coordinate system of the rake implement, and the processor is configured or programmed to generate first swath information indicating a relationship between the position of the formed swath and a position of grass collected to form the swath, in the geographic coordinate system, based on the swath position information and the rake implement information.

Item 8

The farming support system according to item 7, further including a storage to store first grass information about grass for each predetermined area of a field, wherein the processor is configured or programmed to generate second swath information in which the position of the formed swath is associated with the first grass information, based on the first swath information and the first grass information.

Item 9

The farming support system according to any one of items 1 to 8, further including a second position detector provided in one of the work vehicle and a baler attachable to the work vehicle, wherein the processor is configured or programmed to obtain, based on baler information about the baler, a second positional relationship between a reference point to be positioned by the second position detector, and a position where the baler picks up the swath, in a local coordinate system that is defined for the work vehicle and the baler which is attached to the work vehicle.

Item 10

In the farming support system according to item 9, the second position detector is provided in the work vehicle, and the first and second position detectors are the same position detector.

Item 11

In the farming support system according to item 9 or 10, the rake implement information includes information indicating a relationship between the position of the swath to be formed by the rake implement and a range in which the rake implement collects grass to form the swath, in a local coordinate system of the rake implement, and the processor is configured or programmed to generate first swath information indicating a relationship between the position of the formed swath and a position of grass collected to form the swath, in the geographic coordinate system, based on the swath position information and the rake implement information.

Item 12

The farming support system according to item 11, further including a storage to store first grass information about grass for each predetermined area of a field, wherein the processor is configured or programmed to generate second swath information in which the position of the formed swath is associated with the first grass information, based on the first swath information and the first grass information.

Item 13

In the farming support system according to item 11, the processor is configured or programmed to obtain information about start and end of formation of a bale formed by the baler, and reference point information indicating a position of the reference point in the geographic coordinate system detected by the second position detector during a work of forming the bale, the processor is configured or programmed to determine a formation start position and a formation end position of the bale in the geographic coordinate system, based on the information about the start and the end of formation of the bale, the reference point information, and the second positional relationship, the processor is configured or programmed to generate grass position information indicating a position of grass associated with the swath located between the formation start position and the formation end position of the bale, based on the first swath information, and the processor is configured or programmed to generate first bale information in which the bale is associated with the grass position information.

Item 14

In the farming support system according to item 12, the processor is configured or programmed to obtain information about start and end of formation of a bale formed by the baler, and reference point information indicating a position of the reference point in the geographic coordinate system detected by the second position detector during a work of forming the bale, the processor is configured or programmed to determine a formation start position and a formation end position of the bale in the geographic coordinate system, based on the information about the start and the end of formation of the bale, the reference point information, and the second positional relationship, the processor is configured or programmed to generate second grass information about grass associated with the swath located between the formation start position and the formation end position of the bale, based on the second swath information, and the processor is configured or programmed to generate second bale information in which the bale is associated with the second grass information.

Item 15

In the farming support system according to item 13 or 14, the information about the start and the end of formation of the bale includes information about a formation start time and a formation end time of the bale, the processor is configured or programmed to determine the formation start position of the bale, based on a position of the reference point in the geographic coordinate system detected by the second position detector at the formation start time, and the processor is configured or programmed to determine the formation end position of the bale, based on a position of the reference point in the geographic coordinate system detected by the second position detector at the formation end time.

Item 16

In the farming support system according to any one of items 1 to 15, the processor is configured or programmed to set a travel path of a baler to form a bale, based on the swath position information.

Item 17

In the farming support system according to item 16, the processor is configured or programmed to set a line passing through a position of a center in a transverse direction of the formed swath, as a travel path for the baler, based on the swath position information.

Item 18

A method for generating position information indicating a position of a swath, the method including obtaining, based on rake implement information about a rake implement, a first positional relationship between a reference point to be positioned by a first position detector and a swath to be formed by the rake implement, in a local coordinate system that is defined for a work vehicle and the rake implement which is attached to the work vehicle, and generating swath position information indicating a position of the swath in a geographic coordinate system, based on information indicating a position of the reference point in the geographic coordinate system detected by the first position detector during a work of forming the swath, and the first positional relationship.

Item 19

A non-transitory computer readable medium storing a computer program to cause a computer to execute a process of generating position information indicating a position of a swath, the computer program being executable to cause the computer to perform obtaining, based on rake implement information about a rake implement, a first positional relationship between a reference point to be positioned by a first position detector and a swath to be formed by the rake implement, in a local coordinate system that is defined for a work vehicle and the rake implement which is attached to the work vehicle, and generating swath position information indicating a position of the swath in a geographic coordinate system, based on information indicating a position of the reference point in the geographic coordinate system detected by the first position detector during a work of forming the swath, and the first positional relationship.

Item 20

A processor for generating position information indicating a position of a swath, the processor including a processor, and a storage to store a computer program to control an operation of the processor, wherein the processor is configured to execute the computer program to perform obtaining, based on rake implement information about a rake implement, a first positional relationship between a reference point to be positioned by a first position detector and a swath to be formed by the rake implement, in a local coordinate system that is defined for a work vehicle and the rake implement which is attached to the work vehicle, and generating swath position information indicating a position of the swath in a geographic coordinate system, based on information indicating a position of the reference point in the geographic coordinate system detected by the first position detector during a work of forming the swath, and the first positional relationship.

Preferred embodiments of the present disclosure are applicable to, for example, farming support systems for providing support for agricultural works related to grass.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A farming support system comprising:
a first position detector provided in one of a work vehicle and a rake implement attachable to the work vehicle; and
a processor configured or programmed to obtain, based on rake implement information about the rake implement, a first positional relationship between a reference point to be positioned by the first position detector and a swath to be formed by the rake implement, in a local coordinate system that is defined for the work vehicle and the rake implement which is attached to the work vehicle; wherein
the processor is configured or programmed to generate swath position information indicating positions of a plurality of swaths in a geographic coordinate system, based on information indicating a position of the reference point in the geographic coordinate system detected by the first position detector during a work of forming the plurality of swaths, and the first positional relationship;
the processor is configured or programmed to associate coordinates indicated by the generated swath position information with map information of a field to generate a map of the field that includes the positions of the formed plurality of swaths based on the generated swath position information;
the processor is configured or programmed to control a display to display the map;
the map displayed on the display indicates the positions of the plurality of swaths generated based on the generated swath position information;
in response to one of the plurality of swaths being selected, identification information of the one of the plurality of swaths that is selected is displayed on the display in a window alongside the map; and
the identification information includes one or more of a specie, a moisture content, or a growth state of grass of the one of the plurality of swaths that is selected.

2. The farming support system according to claim 1, wherein
the rake implement information includes information indicating a relationship between a reference position of the rake implement in a local coordinate system of the rake implement and the position of the swath to be formed by the rake implement;
the processor is configured or programmed to obtain first information indicating a relationship between the reference position of the rake implement and the position of the reference point; and
the processor is configured or programmed to determine the first positional relationship, based on the rake implement information and the first information.

3. The farming support system according to claim 1, wherein
the first position detector is provided in the work vehicle;
the rake implement information includes information indicating a relationship between a reference position of the rake implement in a local coordinate system of the rake implement, and the position of the swath to be formed by the rake implement;
the processor is configured or programmed to obtain second information indicating a relationship between the reference point and a reference position of the work vehicle, and third information indicating a relationship between the reference position of the work vehicle and the reference position of the rake implement; and
the processor is configured or programmed to determine the first positional relationship, based on the rake implement information, the second information, and the third information.

4. The farming support system according to claim 1, wherein
the rake implement information is stored in the rake implement, and is transmitted from the rake implement to the work vehicle when the rake implement is attached to the work vehicle; and
the processor is configured or programmed to obtain the rake implement information from the work vehicle.

5. The farming support system according to claim 1, further comprising:
a storage to store rake implement information about a plurality of models of the rake implements; wherein
model information indicating the model of the rake implement is transmitted from the rake implement to the work vehicle when the rake implement is attached to the work vehicle;
the processor is configured or programmed to obtain the model information from the work vehicle; and
the processor is configured or programmed to obtain, from the storage, the rake implement information corresponding to the model indicated by the model information.

6. The farming support system according to claim 1, wherein
the rake implement information includes information indicating a relationship between the position of the swath to be formed by the rake implement and a range in which the rake implement collects grass, in a local coordinate system of the rake implement; and
the processor is configured or programmed to generate first swath information indicating a relationship between the position of the formed swath and a position of grass collected to form the swath, in the geographic coordinate system, based on the swath position information and the rake implement information.

7. The farming support system according to claim 6, further comprising:
a storage to store first grass information about grass for each predetermined area of the field; wherein
the processor is configured or programmed to generate second swath information in which the position of the formed swath is associated with the first grass information, based on the first swath information and the first grass information.

8. The farming support system according to claim 1, further comprising:
a second position detector provided in one of the work vehicle and a baler attachable to the work vehicle; wherein
the processor is configured or programmed to obtain, based on baler information about the baler, a second positional relationship between a reference point to be positioned by the second position detector, and a position where the baler picks up the swath, in a local coordinate system that is defined for the work vehicle and the baler which is attached to the work vehicle.

9. The farming support system according to claim 8, wherein
the second position detector is provided in the work vehicle; and
the first and second position detectors are the same position detector.

10. The farming support system according to claim 8, wherein
the rake implement information includes information indicating a relationship between the position of the swath to be formed by the rake implement and a range in which the rake implement collects grass to form the swath, in a local coordinate system of the rake implement; and
the processor is configured or programmed to generate first swath information indicating a relationship between the position of the formed swath and a position of grass collected to form the swath, in the geographic coordinate system, based on the swath position information and the rake implement information.

11. The farming support system according to claim 10, further comprising:
a storage to store first grass information about grass for each predetermined area of the field; wherein
the processor is configured or programmed to generate second swath information in which the position of the formed swath is associated with the first grass information, based on the first swath information and the first grass information.

12. The farming support system according to claim 11, wherein
the processor is configured or programmed to obtain information about start and end of formation of a bale formed by the baler, and reference point information indicating a position of the reference point in the geographic coordinate system detected by the second position detector during a work of forming the bale;
the processor is configured or programmed to determine a formation start position and a formation end position of the bale in the geographic coordinate system, based on the information about the start and end of formation of the bale, the reference point information, and the second positional relationship;
the processor is configured or programmed to generate second grass information about grass associated with the swath located between the formation start position and the formation end position of the bale, based on the second swath information; and
the processor is configured or programmed to generate second bale information in which the bale is associated with the second grass information.

13. The farming support system according to claim 10, wherein
the processor is configured or programmed to obtain information about start and end of formation of a bale formed by the baler, and reference point information indicating a position of the reference point in the geographic coordinate system detected by the second position detector during a work of forming the bale;
the processor is configured or programmed to determine a formation start position and a formation end position of the bale in the geographic coordinate system, based on the information about the start and end of formation of the bale, the reference point information, and the second positional relationship;
the processor is configured or programmed to generate grass position information indicating a position of grass associated with the swath located between the formation start position and the formation end position of the bale, based on the first swath information; and
the processor is configured or programmed to generate first bale information in which the bale is associated with the grass position information.

14. The farming support system according to claim 13, wherein
the information about the start and the end of formation of the bale includes information about a formation start time and a formation end time of the bale;
the processor is configured or programmed to determine the formation start position of the bale, based on a position of the reference point in the geographic coordinate system detected by the second position detector at the formation start time; and
the processor is configured or programmed to determine the formation end position of the bale, based on a position of the reference point in the geographic coordinate system detected by the second position detector at the formation end time.

15. The farming support system according to claim 1, wherein the processor is configured or programmed to set a travel path of a baler based on the swath position information.

16. The farming support system according to claim 15, wherein the processor is configured or programmed to set a line passing through a position of a center in a transverse direction of the formed swath, as a travel path for the baler, based on the swath position information.

17. A method for generating position information indicating positions of a plurality of swaths, the method comprising:
obtaining, based on rake implement information about a rake implement, a positional relationship between a reference point to be positioned by a position detector and a swath to be formed by the rake implement, in a local coordinate system that is defined for a work vehicle and the rake implement which is attached to the work vehicle;
generating swath position information indicating the positions of the plurality of swaths in a geographic coordinate system, based on information indicating a position of the reference point in the geographic coordinate system detected by the position detector during a work of forming the plurality of swaths, and the positional relationship;

associating coordinates indicated by the generated swath position information with map information of a field to generate a map of the field that includes the positions of the formed plurality of swaths based on the generated swath position information; and controlling a display to display the map; wherein the map displayed on the display indicates the positions of the plurality of swaths generated based on the generated swath position information;

in response to one of the plurality of swaths being selected, identification information of the one of the plurality of swaths that is selected is displayed on the display in a window alongside the map; and the identification information includes one or more of a specie, a moisture content, or a growth state of grass of the one of the plurality of swaths that is selected.

18. A processing device for generating position information indicating positions of a plurality of swaths, the processing device comprising:

a processor; and a storage to store a computer program to control an operation of the processor; wherein the processor is configured to execute the computer program to perform:

obtaining, based on rake implement information about a rake implement, a positional relationship between a reference point to be positioned by a position detector and a swath to be formed by the rake implement, in a local coordinate system that is defined for a work vehicle and the rake implement which is attached to the work vehicle;

generating swath position information indicating the positions of the plurality of swaths in a geographic coordinate system, based on information indicating a position of the reference point in the geographic coordinate system detected by the position detector during a work of forming the plurality of swaths, and the positional relationship;

associating coordinates indicated by the generated swath position information with map information of a field to generate a map of the field that includes the positions of the formed plurality of swaths based on the generated swath position information; and controlling a display to display the map; wherein the map displayed on the display indicates the positions of the plurality of swaths generated based on the generated swath position information;

in response to one of the plurality of swaths being selected, identification information of the one of the plurality of swaths that is selected is displayed on the display in a window alongside the map; and the identification information includes one or more of a specie, a moisture content, or a growth state of grass of the one of the plurality of swaths that is selected.

19. A farming support system comprising:

a first position detector provided in one of a work vehicle and a rake implement attachable to the work vehicle; and a processor configured or programmed to obtain, based on rake implement information about the rake implement, a first positional relationship between a reference point to be positioned by the first position detector and a swath to be formed by the rake implement, in a local coordinate system that is defined for the work vehicle and the rake implement which is attached to the work vehicle; wherein the processor is configured or programmed to generate swath position information indicating a position of the swath in a geographic coordinate system, based on information indicating a position of the reference point in the geographic coordinate system detected by the first position detector during a work of forming the swath, and the first positional relationship;

the processor is configured or programmed to set a line passing through a position of a center in a transverse direction of the formed swath, as a travel path for a baler, based on the generated swath position information; and the processor is configured or programmed to control the work vehicle such that the baler travels along the travel path for the baler so that an appropriate positional relationship between the baler and the swath is maintained.

* * * * *